(12) United States Patent  
Truitner

(10) Patent No.: US 11,907,841 B1  
(45) Date of Patent: Feb. 20, 2024

(54) MACHINE LEARNING BASED CONSUMER PRODUCT IDENTIFICATION SYSTEM AND METHOD THEREFOR

(71) Applicant: Ian Truitner, Safety Harbor, FL (US)

(72) Inventor: Ian Truitner, Safety Harbor, FL (US)

( * ) Notice: Subject to any disclaimer, the term of this patent is extended or adjusted under 35 U.S.C. 154(b) by 0 days.

(21) Appl. No.: 18/141,601

(22) Filed: May 1, 2023

(51) Int. Cl.
  *G06N 3/08* (2023.01)

(52) U.S. Cl.
  CPC ..................... *G06N 3/08* (2013.01)

(58) Field of Classification Search
  CPC ....................................... G06N 3/08
  See application file for complete search history.

(56) References Cited

U.S. PATENT DOCUMENTS

| | | | | |
|---|---|---|---|---|
| 9,218,364 | B1* | 12/2015 | Garrigues | G06F 16/5866 |
| 10,565,635 | B2 | 2/2020 | Forss | |
| 10,595,006 | B2 | 3/2020 | Lee et al. | |
| 10,908,614 | B2 | 2/2021 | Fowe | |
| 10,949,714 | B2 | 3/2021 | Gur et al. | |
| 11,087,173 | B2 | 8/2021 | Hou et al. | |
| 11,195,057 | B2 | 12/2021 | Zadeh et al. | |
| 2011/0078191 | A1* | 3/2011 | Ragnet | G06F 18/214 |
| | | | | 707/E17.039 |
| 2012/0017232 | A1* | 1/2012 | Hoffberg | F24F 11/30 |
| | | | | 725/9 |
| 2016/0364419 | A1* | 12/2016 | Stanton | G06F 16/41 |
| 2019/0163985 | A1* | 5/2019 | Wang | G06Q 30/00 |
| 2021/0182922 | A1 | 6/2021 | Zheng et al. | |
| 2021/0248772 | A1 | 8/2021 | Iqbal et al. | |
| 2021/0374836 | A1* | 12/2021 | Bronicki | G06Q 10/0639 |
| 2022/0036043 | A1 | 2/2022 | Sakashita | |
| 2022/0083797 | A1 | 3/2022 | Kim | |
| 2022/0084181 | A1* | 3/2022 | Isken | G01N 21/8422 |
| 2022/0187841 | A1* | 6/2022 | Ebrahimi Afrouzi | |
| | | | | G05D 1/0242 |
| 2023/0133152 | A1* | 5/2023 | Barnehama | G06T 7/90 |
| | | | | 382/141 |

FOREIGN PATENT DOCUMENTS

| KR | 102313918 | 10/2021 |
| WO | 2017011814 | 1/2017 |

* cited by examiner

*Primary Examiner* — Qun Shen  
(74) *Attorney, Agent, or Firm* — Minta Law Group LC; Veronica-Adele R. Cao

(57) ABSTRACT

A machine learning based system and method for automated recognition of consumer products in images and video using a camera system, a neural network using a ranked tagging system, a two-stage recognition application, and a training module. Training image sets of items captured by the camera system are assigned identification tags through template matches to training sets within the neural network. Tags are assigned from various levels of specificity to identify exact product matches. A user recognition application captures images and generates bounding boxes for detected objects and assigns a general classification within the image using a single, fast, convolutional neural network (CNN) layer. General classification narrows subsets for each generated bounding box and multi-scale template matching is applied to achieve detailed identification of single or multiple items detected within single images or video. The training module adjusts smart camera systems and the neural network based on accuracy feedback.

21 Claims, 22 Drawing Sheets  
(13 of 22 Drawing Sheet(s) Filed in Color)

MACHINE LEARNING BASED CONSUMER PRODUCT IDENTIFICATION SYSTEM AND METHOD THEREFOR

FIELD OF THE INVENTION

The present invention relates generally to the field of consumer products. More specifically, the present invention is a machine learning based consumer product identification system and method therefor,

BACKGROUND OF THE INVENTION

As artificial intelligence (AI) systems become widespread, operations occurring within the machines must work efficiently in order to be effective and useful in practice. If there is a high margin of error within the machine's ability to understand and respond, then the machine is neither effective nor useful. When performing fairly low-risk functions, such as voice recognition, a machine that fails to understand you may be frustrating. However, when a machine fails to work in high-risk circumstances, such as in autonomous vehicles at high speed, a machine failure could lead to more dire consequences.

With AI systems, the machine is only as "intelligent" as the input that it is given. Volumes of human-produced and curated data must be provided to a machine, and that data must be highly accurate and adaptive if the machine is to output effective and useful responses. If data input at the foundational level is flawed or misleading, this can create a chain reaction within the machine and render the machine ineffective. While this may seem to be an obvious facet of AI, there is currently no uniform process for creating consistently accurate and adaptive object recognition training sets for the machine.

Additional shortcomings with current AI systems are in the areas of speed and accuracy. While some existing methods yield a relatively good degree of accuracy, they are cumbersome and tedious from a data processing perspective. Others are fast but have a low level of accuracy and/or only produce very broad results that are not very useful.

There is a need to strike a balance between speed and accuracy in AI systems. The four main steps in AI system object identification processes are:
a. Machine Training: A computing system is trained;
b. Image Acquisition: An image is captured and entered into a machine;
c. Image Processing: The machine processes the image through specific tasks; and
d. Image Interpretation: The machine detects and/or identifies objects in an image and performs an output.

The present invention improves the curation of training data sets used in the machine training step, improves classification methodology, and provides a two-step process for improving specific object recognition.

Another area of AI systems that requires improvement is in the recognition of partially obscured objects. One of the biggest issues in replicating how a human mind works is in the area of abstract thinking. Even at an early age, when a typical person looks at a familiar object that is partially obscured, their mind can "fill in the blanks" and the person knows that the rest of the object is there. For example, during a game of peek-a-boo, a young child would know that its mother is present despite her face being obscured by a pillow. In AI systems, the machine does not intuitively know this. The AI system must be trained to recognize parts/ portions of an object and the context in which it may more efficiently and accurately determine what the object is.

Therefore, the present invention improves existing AI systems object recognition systems by providing higher quality and increased uniformity within training sets, increasing the system's ability to recognize partially obscured objects, and improving details about objects beyond mere broad descriptions.

SUMMARY OF THE INVENTION

In accordance with one or more embodiments of the present invention, a consumer product identification system is disclosed. The system comprises a consumer product identification system comprising: a camera system configured to create an image set of a known consumer product; a neural network configured to: receive the image set of the known consumer product from the camera system; store the image set as a template image set in a database connected to the neural network; assign a plurality of identification tags to the template image set of the known consumer product, wherein the plurality of identification tags is based on characteristics of the known consumer product; and generate a machine learning model which is trained based on the assigned set of identification tags to output the known consumer product; a recognition application configured to: receive an input image of an unknown consumer product; compare the input image of the unknown consumer product to the template image set of the known consumer product; determine whether the input image of the unknown consumer product matches the template image set of the known consumer product; and identify the unknown consumer product when the image of the unknown consumer product matches the template image set of the known consumer product; and a training module configured to: receive feedback from a system user regarding accuracy of identification of the unknown consumer product; adjust settings in at least one of the camera system, the neural network, and the recognition application based on the feedback received from the system user.

In accordance with one or more embodiments of the present invention, a method for performing consumer product identification is disclosed. The method for identifying consumer products comprises: a camera system creating an image set of a known consumer product for storage on a database, the image set comprising a plurality of images having a pixel size of 3840×2160 pixels; a neural network: selecting five core images from the image set of the known consumer product; compressing each of the five core images to a square 1080×1080-pixel frame; designating the five core images as a template image set for template matching; assigning a plurality of identification tags to the template image set, wherein the plurality of identification tags is based on characteristics of the known consumer product; and generating a machine learning model which is trained based on the assigned plurality of identification tags to output the known consumer product; a recognition application: receiving an input image of at least one unknown consumer product; assigning a general classification to the at least one unknown consumer product within the input image; selecting one template image set from a plurality of template images sets stored on the database, wherein the selected template image set belongs to the same general classification as the at least one unknown consumer product within the input image; applying a template matching algorithm to compare the input image of the at least one unknown consumer product to the selected template image set; determining whether a match between the input image of the at least one unknown consumer product and the selected template image set is greater than 99%, between 90% and 99%, or less than 90% accurate; and sending information relating to the at least one unknown consumer product to an electronic device of a consumer when the match between the input image of the at least one unknown consumer product and the template image set of the known consumer product is greater than 90%, between 90% and 99%.

In accordance with another embodiment of the present invention, a non-transitory computer-readable medium is disclosed. The non-transitory computer-readable medium has stored thereon computer executable instructions that when executed by a computer, causes the computer to execute operations, the operations comprising: receiving images associated with each of a plurality of known consumer products; generating identification tags associated with characteristics of each of the known consumer products; determining a set of identification tags associated with each of the plurality of known consumer products, based on the generated identification tags, wherein the set of identification tags are determined according to a ranked tagging system that provides increasing levels of detail with each tag; and generating a machine learning model which is trained based on the determined set of identification tags to output one consumer product from the plurality of known consumer products.

BRIEF DESCRIPTION OF THE DRAWINGS

The patent or application contains at least one drawing or photograph executed in color. Copies of this patent or patent application publication with color drawing(s) or photograph(s) will be provided by the Office upon request and payment of the necessary fee.

The present application is further detailed with respect to the following drawings. These figures are not intended to limit the scope of the present application, but rather, illustrate certain attributes thereof.

DETAILED DESCRIPTION OF THE INVENTION

Figure 1:
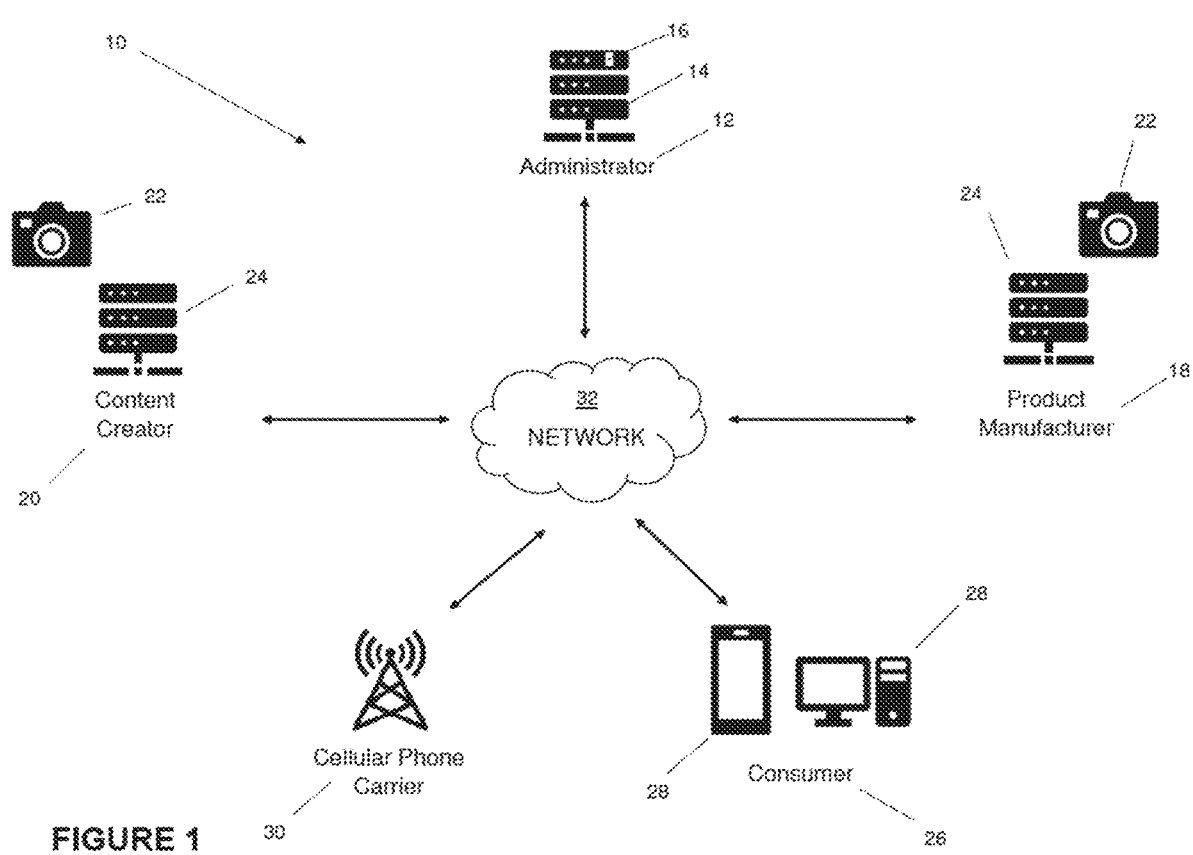
FIG. 1 is diagram that illustrates an exemplary consumer product identification system according to one or more aspects of the present invention.

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

Currently, there are three ways that an Artificial Intelligence (AI) system may recognize an object and output useful information about that object. These three ways are:

a. Object Detection: Recognition that an object exists within an image;

b. Object Localization: Determination of where any given object is within and image; and c. Object Identification: Providing information about what an object is.

Pattern recognition is a data analysis method that uses computer algorithms to automatically recognize patterns and regularities in data in order to identify an object in an image. The word "image" or phrase "digital image" as used herein should be understood to include raster images with the file extensions of jpeg, gif and/or png. It should also be clearly understood that the word "image" may also include vector images with the file extensions of eps, ai, and pdf. One of the tools used in pattern recognition is template matching. Template matching is a digital image processing technique for finding small parts of an image that match a template image. Currently, template matching may be used in medical image processing, quality control in manufacturing, and in facial recognition. Template matching uses an existing template (image), applies a mathematical formula to the template image and slides it across an input image, generating probable matches based on a mathematical algorithm. There are different template matching algorithms available, such as the Sum of Absolute Differences (SAD), the Sum of Squared Distances (SSD), Best Buddies Similarity (BBS), and Deformable Diversity Similarity (DDIS). Template matching is most useful within predetermined parameters, such as in facial recognition. However, template matching struggles when an input image is of a different scale or rotation from the template image.

Another tool for object detection is the YOLO (You Only Look Once) model. The YOLO model, which has subsequent iterations such as YOLOv2, YOLO9000, YOLOv3, YOLOv4+, YOLOv5 is a system that uses bounding boxes on a single fully connected layer, allowing it to detect objects in fractions of a second. The best asset of YOLO is that it is very fast, capable of calculating up to 155 frames per second. However, while YOLO is generally good at object identification, it struggles when trying to identify smaller objects. It only generates a single, broad identification moniker for a detected object, such as "car" or "person," which may be acceptable for autonomous vehicles, but it is not especially helpful for consumer product identification.

The present invention improves the speed of current object detection systems and methods by quickly providing broad classification to detected objects and then applying local template matching with an advanced system called Scalable Diversity Similarity (SDS) to find precise matches. The present invention then applies these improvements specifically to the consumer product industry.

Image and object recognition is the next phase of AI system development and it is a critical factor in the viability of augmented reality, virtual reality, automation, and robotics. While the present invention may serve to improve all of those sectors, the present invention focuses on the recognition of objects for the specific purpose of identifying consumer products. Closing the gap between seeing an in item of interest and the ability to identify and purchase it is a critical step in the progress of consumer empowerment.

FIGS. 1-24 together disclose a consumer product identification system 10 (referred to hereinafter as system 10) in accordance with at least one embodiment of the present invention. Referring to FIG. 1, an exemplary consumer product identification system 10 is shown. The system 10 provides a method that allows a consumer 26 to quickly and accurately identify consumer products/goods and purchase them if desired.

The system 10 may comprise a system administrator 12, one or more product manufacturers 18, one or more content creators 20, one or more consumers 26, and at least one cellular phone carrier 30 all connected via a communication network 32 (shown as network 32). The communication network 32 or portions of the communication network 32 may be connected by wired or wireless means which may include, but are not limited to, cellular, satellite, local area network (LAN), wide area network (WAN), Virtual Private Networks (VPN), or global network (e.g. Internet). The network may also include WI-FI® wireless technology and/or BLUETOOTH® wireless technology when the smart camera system 22 communicates with and sends information and updates to the neural network 34 (shown in FIG. 2).

In the system 10, the system administrator 12, the manufacturer 18, and the content creator 20 may communicate with each other over the communication network 32 via. their respective server(s) 14, 24. Although the administrator 12, the manufacturer 18, and the content creator 20 are each depicted as having one server 14, 24 it should be understood that substantial benefit may also be derived from any of the administrator 12, the manufacturer 18, and the content creator 20 having either no server 14, 24 or having more than one server 14, 24.

A consumer 26 may communicate with the administrator 12, the manufacturer 18, or the content creator 20 on his/her electronic device 28. Where the consumer's 26 electronic device 28 is a smartphone or tablet, the consumer 26 may communicate with the administrator 12, the manufacturer 18, or the content creator 20 via his/her cellular phone carrier 30 or directly through the communication network 32 via the Internet. Where the consumer's 26 electronic device 28 is a desktop computer, the consumer 26 may communicate with the administrator 12, the manufacturer 18, or the content creator 20 through the communication network 32 via the Internet.

The administrator's 12 server 14 may have one or more processors 16 and memory or database for storing information relating to the manufacturers 18, the content creators 20, and the consumers 26. For example, regarding information about a consumer 26, the administrator's 12 database may store information such as the consumer's 26 name, authentication credentials (e.g. identification and password), purchasing history, contact information (e.g. phone number, address, e-mail, etc.), as well as the consumer's 26 credit card/debit card/bank account information. Regarding information about a product manufacturer 18, the administrator's 12 database may store information such as the manufacturer's 18 name, authentication credentials (e.g. identification and password), contact information (e.g. phone number, address, e-mail, etc.), and product details. Regarding information about a content creator 20, the administrator's 12 database may store information such as the content creator's 20 name, authentication credentials (e.g. identification and password), contact information (e.g. phone number, address, e-mail, etc.), and previous contributions to the system 10.

The processor(s) 16 may be implemented in hardware, software, or a combination thereof. The processor(s) 16 may store a computer program or other programming instructions associated with the database to control the operation of the system 10. The data and structures and code within the software in which the present invention may be implemented, may typically , be stored on a non-transitory computer-readable storage. The storage may be any device or medium that may store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. The processor(s) 16 may comprise various computing elements, such as integrated circuits, microcontrollers, microprocessors, programmable logic devices, etc. alone or in combination to perform the operations described herein.

Figure 2:
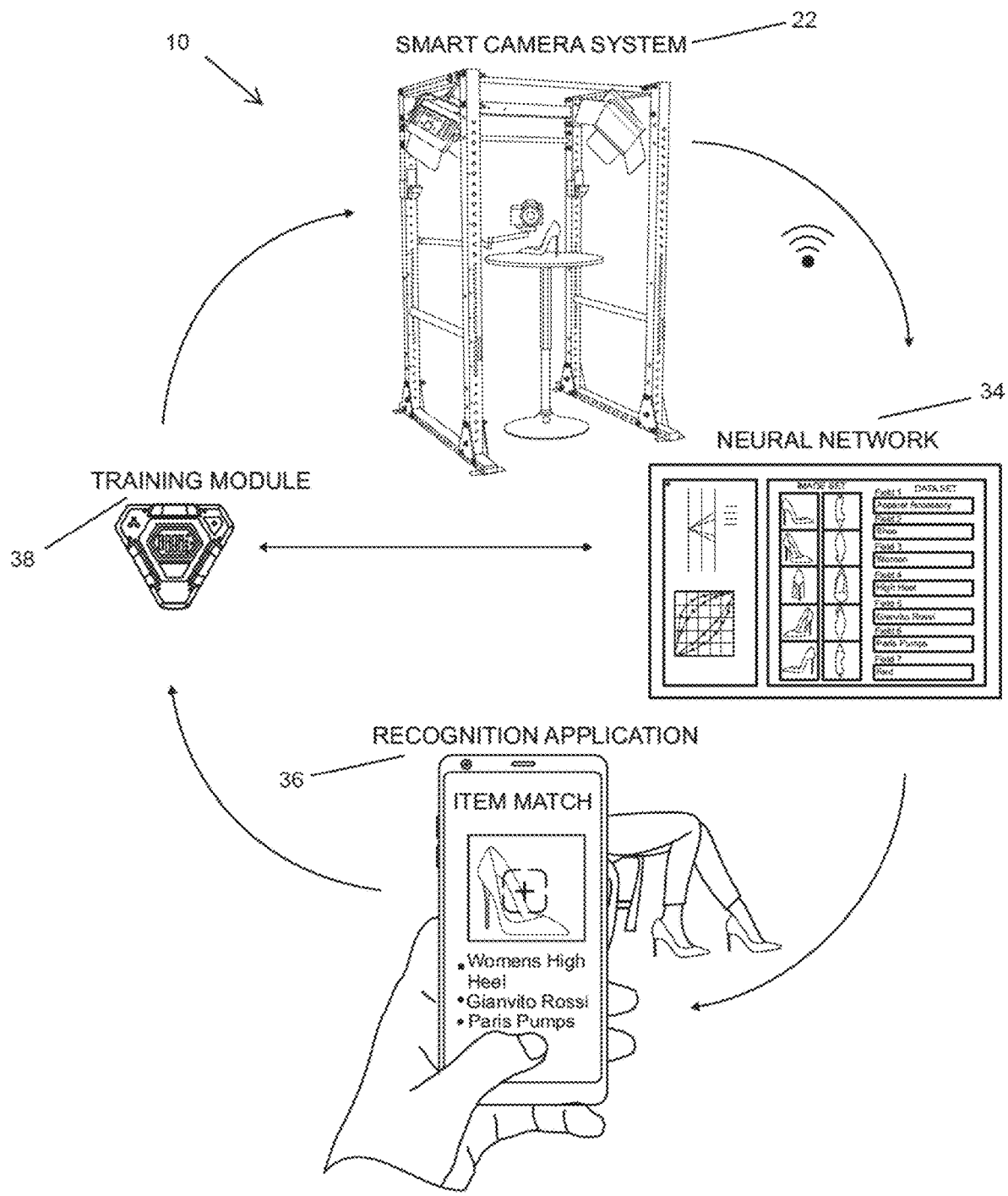
FIG. 2 is a diagram that illustrates exemplary communications occurring between and among hardware and software components of the system in accordance with one or more aspects of the consumer product identification system of FIG. 1.

FIG. 2 is an exemplary diagram showing communications occurring between and among hardware and software components of the consumer product identification system 10 of the present invention. The consumer product identification system 10 is composed of four interconnected components: 1) Modular Smart Camera. System 22; 2) a Flexile Neural Network 34; 3) a Recognition Application 36; and 4) a Training Module 38. The administrator's 12 server 14 is primarily used to manage system users (consumers 26, product manufacturers 18, and content creators 20), electronic devices 28, and user permissions on those devices 28. The recognition application 36 may be downloaded, stored, and implemented by system users (product manufacturer 18, content creator 20, or consumer 26) on their respective electronic devices 28 to perform certain actions. The electronic device 28 shown in this figure is a consumer's 26 electronic device 28 such as a smart phone.

Figure 3:
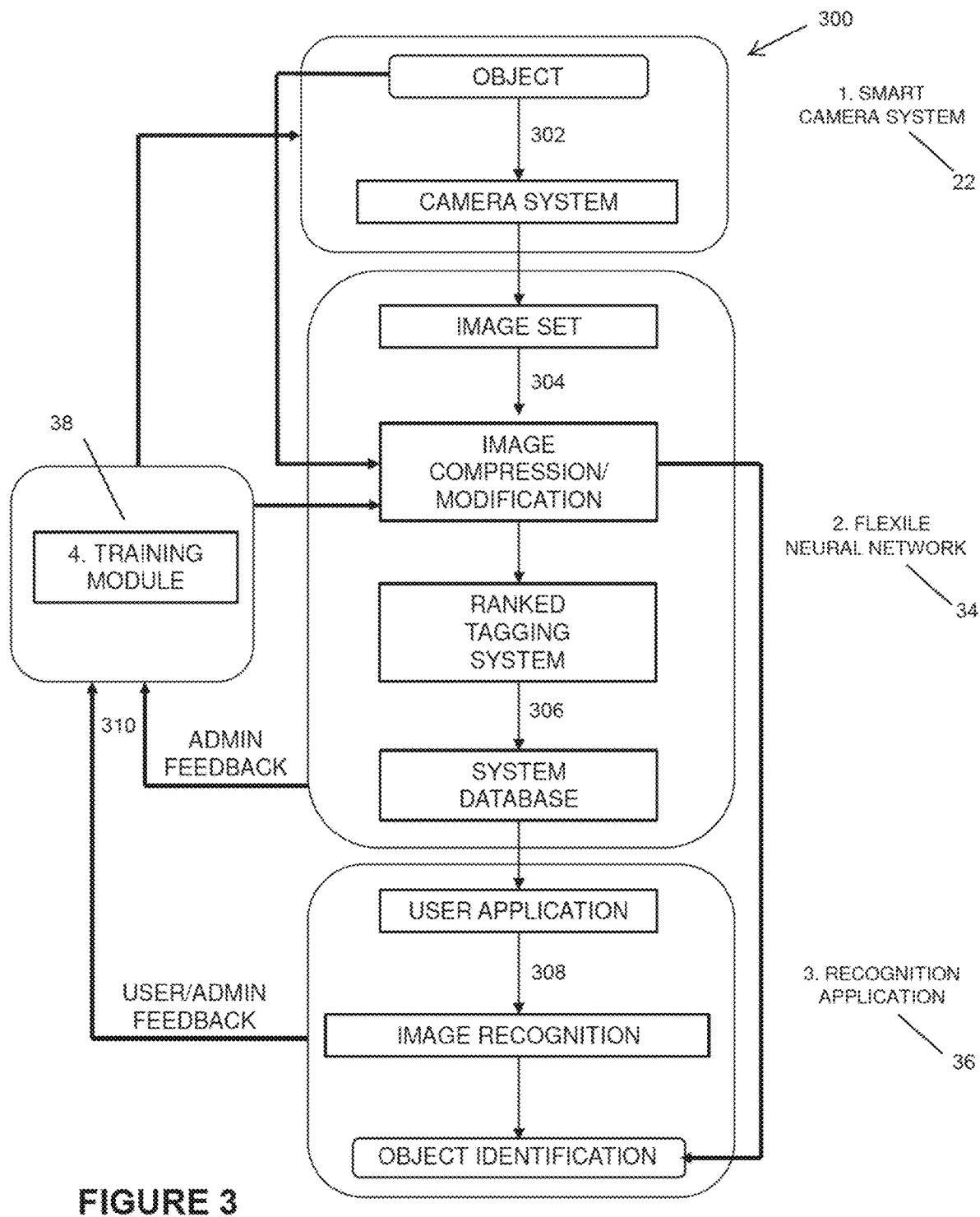
FIG. 3 is an exemplary flowchart showing the steps performed by the consumer product identification system of FIG. 1.

FIG. 3 is a flowchart 300 showing a general overview of the steps performed by the consumer product identification system 10 of the present invention. Generally, at 302 image sets of consumer goods/products are captured by the smart camera system 22 of a product manufacturer 18 or of a content creator 20. At 304 the camera system 22 creates uniform image sets and continually adapts and improves the images through image compression and modification in order to increase recognition probability and efficiency.

At 306 the image sets of objects are then assigned identification tags through template matches to training sets within the neural network 34. These identification tags relate to particular characteristics of the consumer product/object; e.g. type of item, color, material, brand, etc. These images and their assigned tags are stored in the system database. Item specificity is one area of improvement provided by the present invention. When it comes to consumer products, an output of just "car" or "shoe" is not enough. Therefore, a Ranked Tagging System (RTS) in the neural network 34 of the present invention addresses this by providing multiple descriptors of recognized items. Identification tags are assigned to the objects in the image sets and these identification tags are used to identify exact product matches.

At 308, a user recognition application 36 captures images and uses general classification methods as well as multi-scale template matching to achieve more detailed identification of consumer products detected in the captured images. The recognition application 36 is able to detect multiple objects using the YOLO method. For item specificity, the recognition application 36 organizes assigned tags from the RTS and output information relevant for product identification. It uses some objects (non-consumer products) like people and buildings to contextualize other objects (items). For example, if the recognition application 36 identifies an object as a person in an image, the objects overlapping the person have a higher probability of being apparel items.

Another area of improvement provided by the present invention is in determining the least amount of data within a data set that will still produce highly accurate identification within the AI network. When it comes to reaching efficiency at scale, AI must process a large amount of information quickly. If that information is too heavy (source file sizes are too large or too many steps are required in the recognition process), it will result in a cumbersome process and poor user experience. The training module 38 improves the accuracy of item recognition while also optimizing data sets for greatest efficiency. At 310, the training module 38 continually optimizes the image capture process and image compression process of data sets by adjusting smart camera system 20 settings and updating consumer product data within the neural network 34 based on accuracy feedback provided by system users (product manufacturers 18, content creators 20, or consumers 26).

Figure 4:
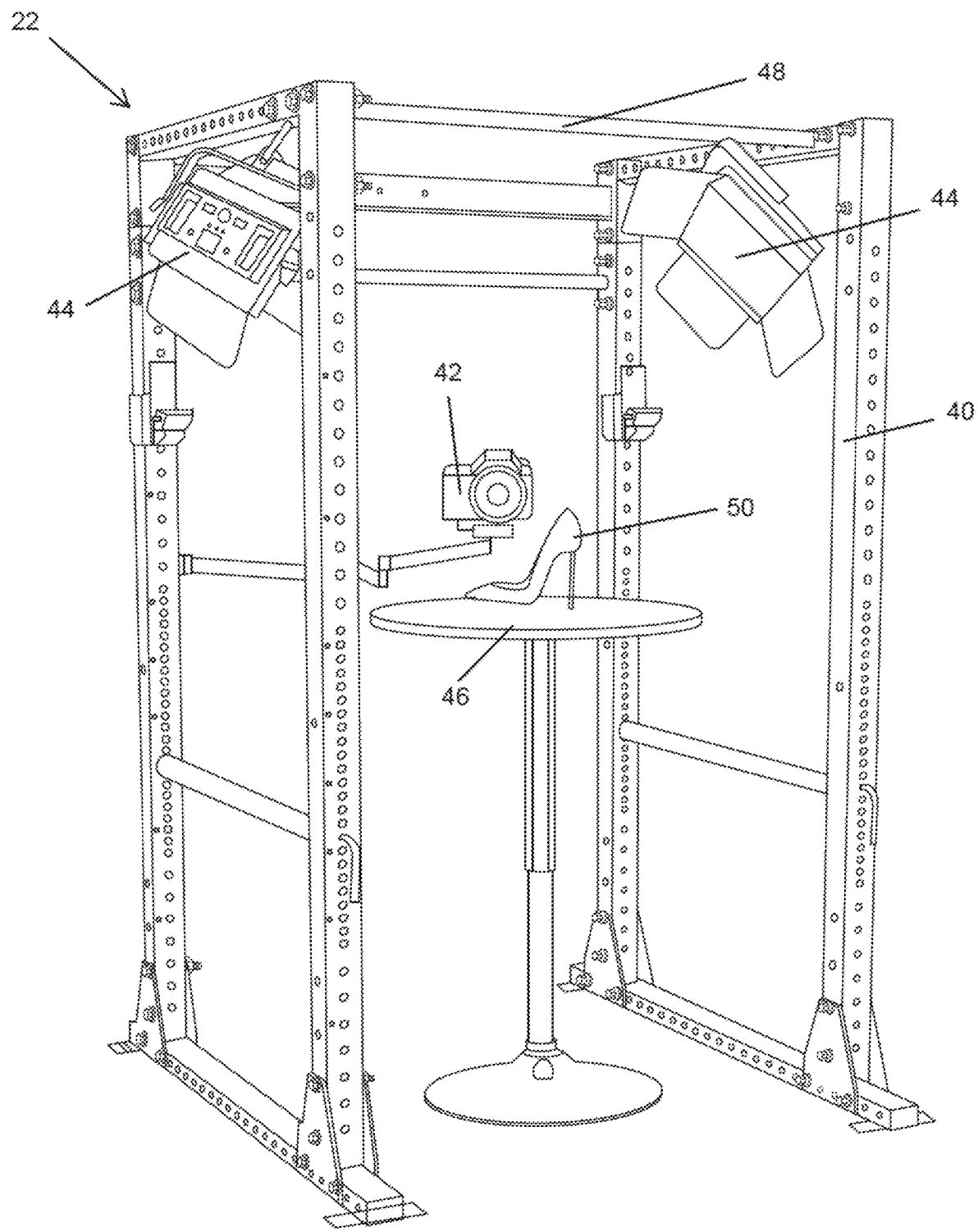
FIG. 4 is a perspective view of an exemplary camera system used with the consumer product identification system of FIG. 1.

FIG. 4 is a perspective view of an exemplary smart camera system 22 used with the consumer product identification system 10 of the present invention. The smart camera system 22 is designed to capture images of known consumer products and to create image sets of those known consumer goods for the neural network 34. The smart camera system 22 is made up of: a modular frame 40; at least one camera 42; adjustable lights 44, a transparent rotating platform 46; and a computing system with connected ports including WI-FI® wireless network technology, BLUETOOTH® wireless technology, and cable inputs.

The camera system 22 may be modular to accommodate items/objects of different sizes, ranging from small (e.g. shoe) to large (e.g. vehicle). The smart camera system 22 may have a transparent rotating platform 46 on which an item may be placed. It should be clearly understood that substantial benefit may also be obtained with an opaque rotating platform 46. The rotating platform 46 may have varying dimension options, ranging from 20 centimeters (about 7.87 inches for smaller items) to up to 5 meters (about 16.4 feet for vehicles) in diameter. The smart camera system 22 may also have movable and adjustable lights 44 that are capable of moving vertically or horizontally on rails 48 that are coupled to the frame 40. Optionally, the adjustable lights 44 may be coupled to the frame 40. For purposes of this disclosure, the item/object described herein is a consumer product 50, specifically, a red pump. However, while the red pump is shown and described herein, it should be clearly understood that substantial benefit will be derived from the item being any other type of good currently available or available in the future to consumers.

As a first step, data regarding an item must be added to the neural network 34 by the product manufacturer 18 or the content creator 20. Optimal template image sets are ideally clear with unobstructed images of the item, do not have any light reflections, and have sufficient detail for the recognition application to identify the item.

When setting up the smart camera system 22 to create template image sets to be connected to or stored on the neural network 34, the operator of the smart camera system 22 may adjust the lighting position and/or intensity to accommodate for the size of the item, for an item having any reflective surfaces (e.g. eyewear), or for an item having a dark color that absorbs light.

The default presets of the camera 42 may be 4K (3840× 2160 pixels) images with transparent backgrounds (PNG files), and one image every 30 degrees of rotation (12 total images initially) while rotating on an X axis (horizontal). An example of the template images generated is shown in the first column under the words "IMAGE SET" of FIG. 5. Then the item is tilted 45 degrees on the rotating platform (i.e. on its side), starting with a top-facing view, and the camera captures one image at every 30 degrees of rotation (i.e. 12 total additional images) to create images of the top and bottom of the item. An example of the template images generated is shown in the second column under the words "IMAGE SET" of FIG. 5. The initial captured set of template images yields a total of 24 images.

The camera system 22 is available to content creators 20 and product manufacturers 18 to create image sets that are stored on the neural network 34 or that are accessible to the neural network 34. For clarification, "on the neural network 34" should be understood to mean either that the images are stored on the computers of the product manufacturers 18/content creators 20 and those computers are connected to the neural network 34 or that the images are stored directly on the neural network 34 itself. As product manufacturers 18 are required to have images of their products available to consumers 26, the camera system 22 would serve the dual role of fulfilling an existing need (providing clear images of their products for advertising and e-commerce purposes) while also making their products easier for consumers 26 to identify with the recognition application 36. Certain items, such as apparel items, may be placed on a transparent mannequin (or stand or other molded object) to allow for the apparel item to take on a shape that more closely matches how the apparel item may appear when worn on a person in an unrestrained environment. The image capture process for these apparel items may replicate how images of items are captured on models for retail sales.

Figure 5:
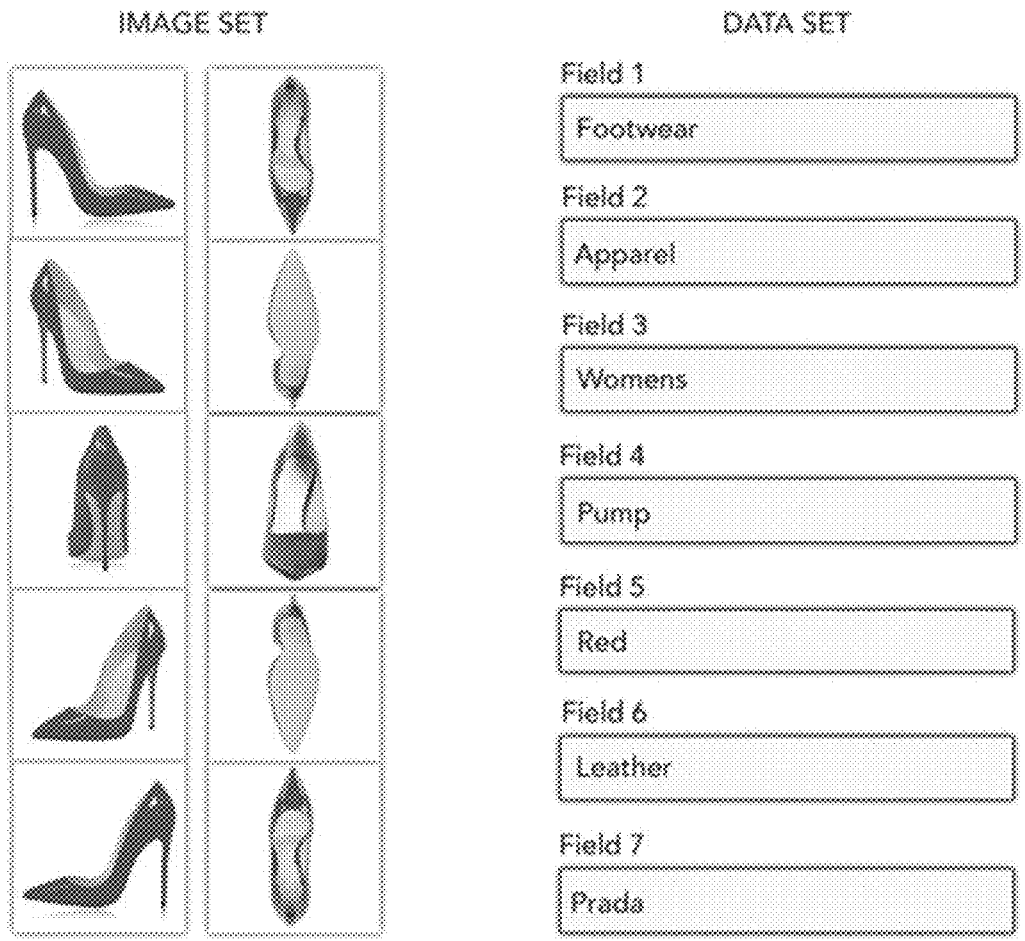
FIG. 5 is a table showing exemplary template image sets and data sets created by a product manufacturer or by a content creator and stored on the neural network.

Identification tags are then applied to the initial template image sets via a ranked tagging system (RTS), providing increasing levels of detail with each tag. Exemplary tags that may be assigned to the initial template image set are shown in the column under the words "DATA SET" as shown in FIG. 5. Initial identification tags will be manually assigned by operator (human) input, but as more image sets are added to the neural network 34, subsequent identification tags will be automatically applied by the neural network 34 through template matches. All image sets are entered into the database and are available as training/template images for matching to input images from the recognition application 36.

Figure 6:
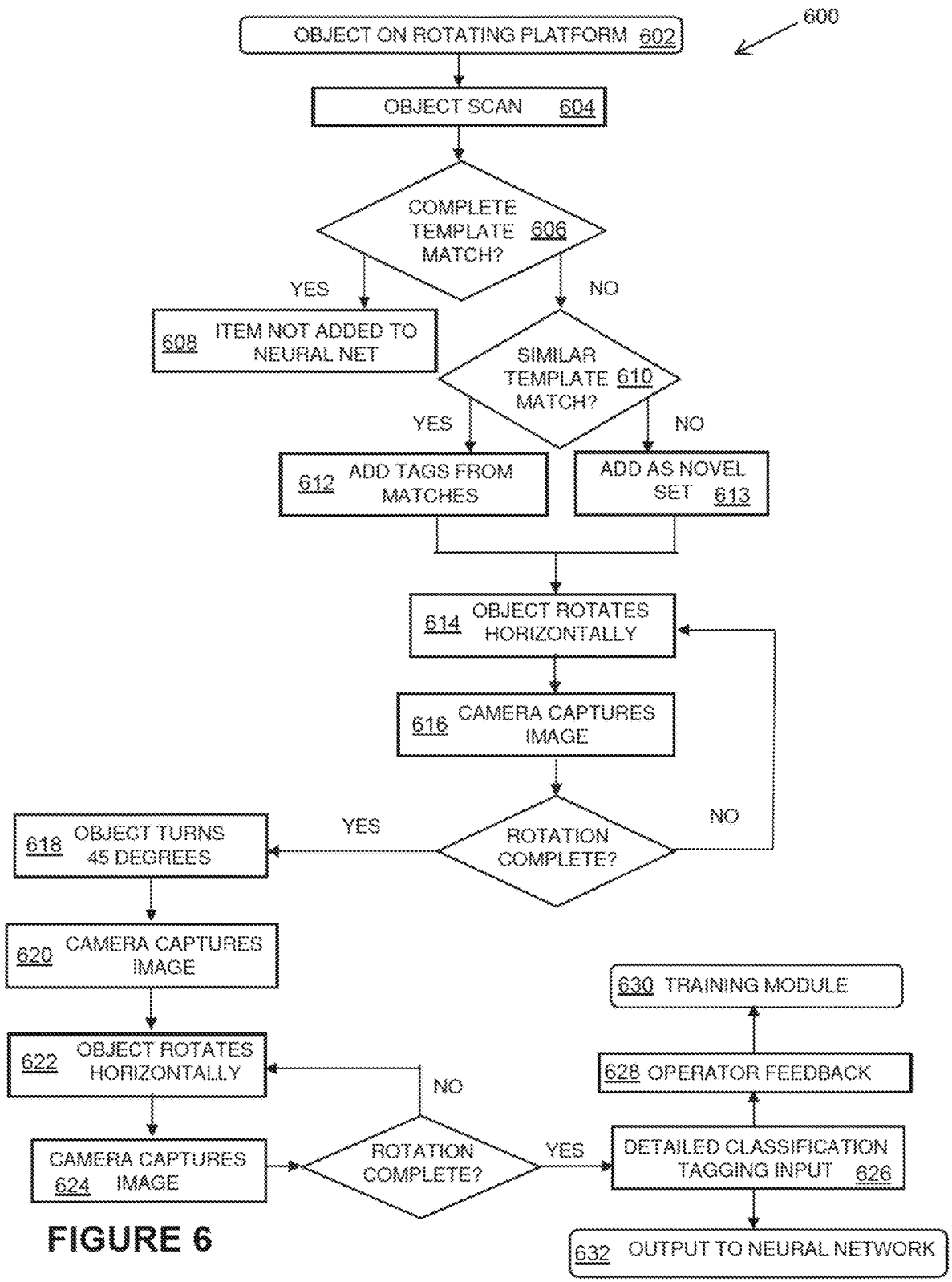
FIG. 6 is an exemplary flowchart showing the steps performed by the camera system of FIG. 4.
Figure 7:
FIG. 7 is an exemplary right-facing profile image of a red pump.
Figure 8:
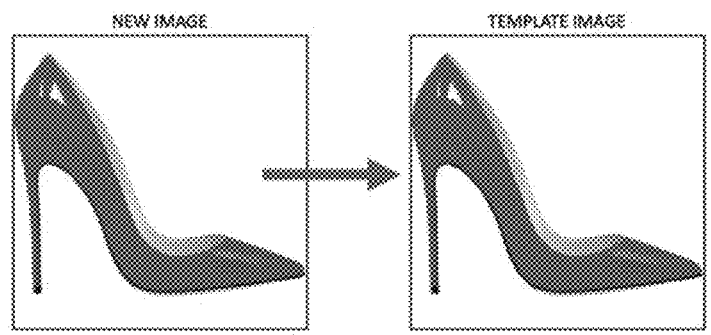
FIG. 8 is an exemplary comparison of a new image set to a template image set on the neural network where an exact match is found.

FIG. 6 is an exemplary flowchart 600 showing the steps performed by the camera system 22 when scanning new items. At 602 an item/object (e.g. the red pump) is placed on the rotating platform by an operator (the person operating the camera system 22). The operator may be a product manufacturer 18 or a content creator 20.

At 604 the item/object is scanned by the camera 42. For the first scan, the red pump may be placed in a right-facing profile position (see FIG. 7). The camera 42 scans the item to create a new set of images, and the training module 38 issues commands to the lighting 44 and rotating platform 46, based on the item's particular properties (e.g. size, color, etc.).

An initial scan of the item using the recognition application 36 installed on the camera system 22 determines the item's general classification set. A classification set is the broadest description of items, such as "footwear," "pants," "shirt," "electronics," "jewelry," "eyewear," "vehicle," etc. The classification set types are configurable by administrators of the neural network 34 to define general categories.

After determining and assigning the general classification to an item, any needed adjustments are automatically made by the camera system 22 to improve the image sets of the item. These adjustments may include adjustments of the lights 44, positioning of the item, and quality of the images. The following may be examples of adjustments that may be needed:

a. If the item is reflective (such as eyewear), the lighting adjusts, which means commands may be given for key lights 44 to physically move (by sliding along the rails 43) from the front of the item to the sides of the item to reduce light reflection;

b. If an item is dark colored (absorbs light), lighting intensity increases to extract more detail from the item. Lights 44 are preferably equipped with adjustable apertures and luminosity features; or c. Side lighting automatically adjusts for the size of the item, so that lights 44 are always positioned in front of, or on the sides of, an item, rather than directly overhead.

Referring to FIG. 6, at 606 the smart camera system 22 runs the newly scanned set of images through the recognition application 36 and the new set of images are compared to images (i.e. template images) already stored in the neural network 34. This comparison (see FIG. 8) determines whether there is an exact match between the new set of images and an existing set of template images. AT 608, if the new set of images exactly matches an existing set of template images on the neural network 34, the smart camera system 22 will alert the operator and the new set of images will not be entered into the neural network 22 because it is deemed redundant. This occurs when the new set of images yields >99% confidence of a template match to an existing item stored on the neural network 34.

Conversely, at 610, if the new set of images is a close match (i.e. 90%-99%) to any existing sets of images stored on the neural network 34, but there are no exact matches, the neural network 34 auto-tags (i.e. automatically tags) matching characteristics of the item from similar existing image sets at 612, and the new set of images are stored in the neural network 34 as a novel set of images (see FIG. 9) with the matching existing tags. If the % confidence is less than 90%, then at 613 the recognition application 36 determines that no match has been found and the new set of images are stored in the neural network 34 as a novel set, but the tags would need to be added manually by the camera system 22 operator.

A novel set of images are then created in similar fashion as that described above and shown in FIG. 5. The camera 42 is set to its default presets of 4K (3840×2160 pixels) images with transparent backgrounds (PNG files). At 614 and 616, one image is taken every 30 degrees of rotation (12 total images) while rotating on an X axis (horizontal). An example of the template images generated is shown in the first column under the words "IMAGE SET" of FIG. 5. Then at 618 the item is tilted 45 degrees on the rotating platform 46 (i.e. on its side), starting with a top-facing view, and at 620, 622, and 624 the camera 42 continues to capture one image at every 30 degrees of rotation (i.e. 12 total additional images) to create images of the top and bottom of the item. When the rotation is complete, the captured set of template images yields a total of 24 images.

An example of a general tagging set for a woman's shoe applied when finding similar (input image >90% confidence) but not greater than 99% confidence may be as follows:

>Classification Set—Footwear
>$1^{st}$ tag—Apparel
>$2^{nd}$ tag—Shoe
>$3^{rd}$ tag—Women
>$4^{th}$ tag—Pump
>$5^{th}$ tag—Red A 90% confidence score may be the default minimum for similarity matches, but this may be modified by administrators for different classification set types.

Figure 9:
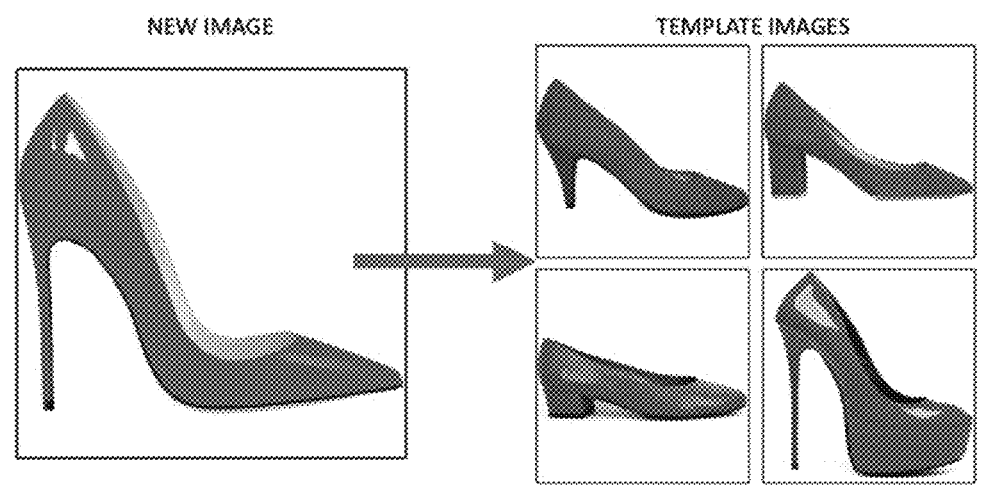
FIG. 9 is an exemplary comparison of a new image set to a template image set on the neural network where an exact match is not found.
Figure 10:
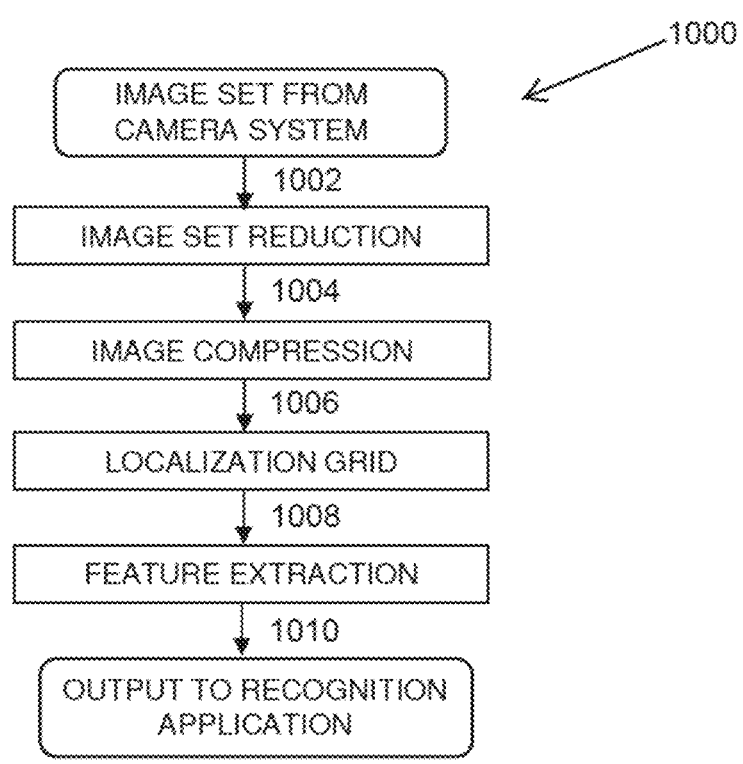
FIG. 10 is an exemplary flowchart showing the steps performed by the neural network portion of the consumer product identification system of FIG. 1.

In a scenario depicted in FIG. 9, the scan classification set and broad description tags will be automatically applied based on common tags shared within existing image sets. Here, the item in the new image has the same classification set and $1^{st}$-$5^{th}$ tags as the items in the template images. The next level of tagging will provide specific information for precise product matching and be as follows:

>6$^{th}$ tag—Material—Leather
>7$^{th}$ tag—Brand—PRADA®
>8$^{th}$ tag—Model—Pointed Triangle-Logo Pump
>9$^{th}$ tag—Year—2023
>10$^{th}$ tag—Season—Summer
>11$^{th}$ tag—Consumer Data (such as hyperlink to e-commerce)
>12$^{th}$ tag—Additional Information (if applicable)

At 626, if it is a novel image set, operators will enter detailed tagging information for the item. The tags described herein are provided as examples. It should be clearly understood that the tag categories and the number of tags are configurable in the neural network 34 to accommodate different product types. For example, instead of "season," which might not be relevant for certain products, an administrator may change this to "size" or some other relevant feature. An additional tag providing information about locale could be added if relevant to the product.

At 628 operators may also provide feedback on the images that are captured. This feedback may be regarding the image quality, the accuracy of the matches, etc. The camera system 22 is connected to the neural network 34 and is updated by the training module 38 at 630 based on operator feedback, such a lighting adjustment and configuration setups for classification sets. More detail on this process is discussed below. At 632, the images may be sent to the neural network 34 without operator feedback.

The primary AI machine learning component of the present invention is the flexile neural network 34 (neural network or neural net). The neural network's 34 machine learning model has the ability to learn and adapt as it receives image sets from the smart camera system(s) 22. The steps performed by the neural network 34 portion of the consumer product identification system 10 of the present invention are shown in the flowchart 1000 of FIG. 10. At 1002 image sets of known consumer products 50 with identification tags enter the neural network 34 through an automated upload process. The images of each of the known consumer products 50 are captured by the camera systems 22 and are assigned identification tags by the neural network 24. Each of the identification tags is associated with a particular characteristic of each consumer product 50 and are either generated by the neural network 24 or are generated manually by the camera system 22 operator. The neural network 24 determines a set of identification tags for each consumer product 50. While images will typically be archived in their original form, image sets for training and template matching may be modified.

Of the initial set of 24 images in a set captured by the camera system 22, 19 images are sent to be stored in the database and are not used for template matching; whereas the remaining 5 core images are designated for active training and template matching. Thus, the number of images is therefore reduced from 24 to 5 at 1004; this reduction is necessary because if too many images are used for template matching, the system 10 would work very slowly. Since the initial set of 24 images was tagged, the 19 images that are stored in the database have already been tagged and are reserved for later use. For example, if it is determined the 5 core images did not produce a high probability of matching, more images may be needed to add to the training set to increase the probability of matching. These additional images are selected from the 19 images stored in the database.

Figure 11:
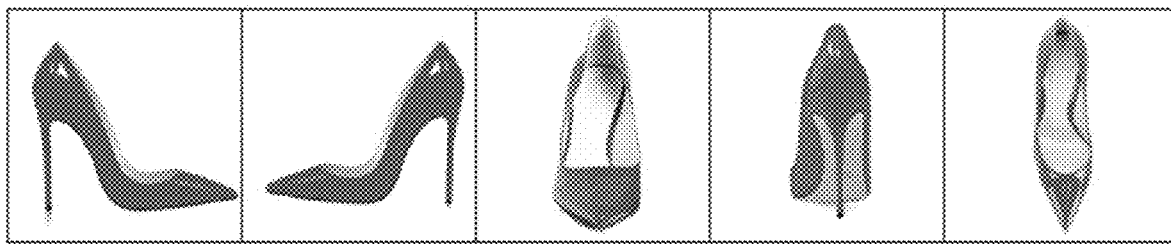
FIG. 11 is an exemplary set of five core remaining images after an image set reduction is performed.
Figure 12:
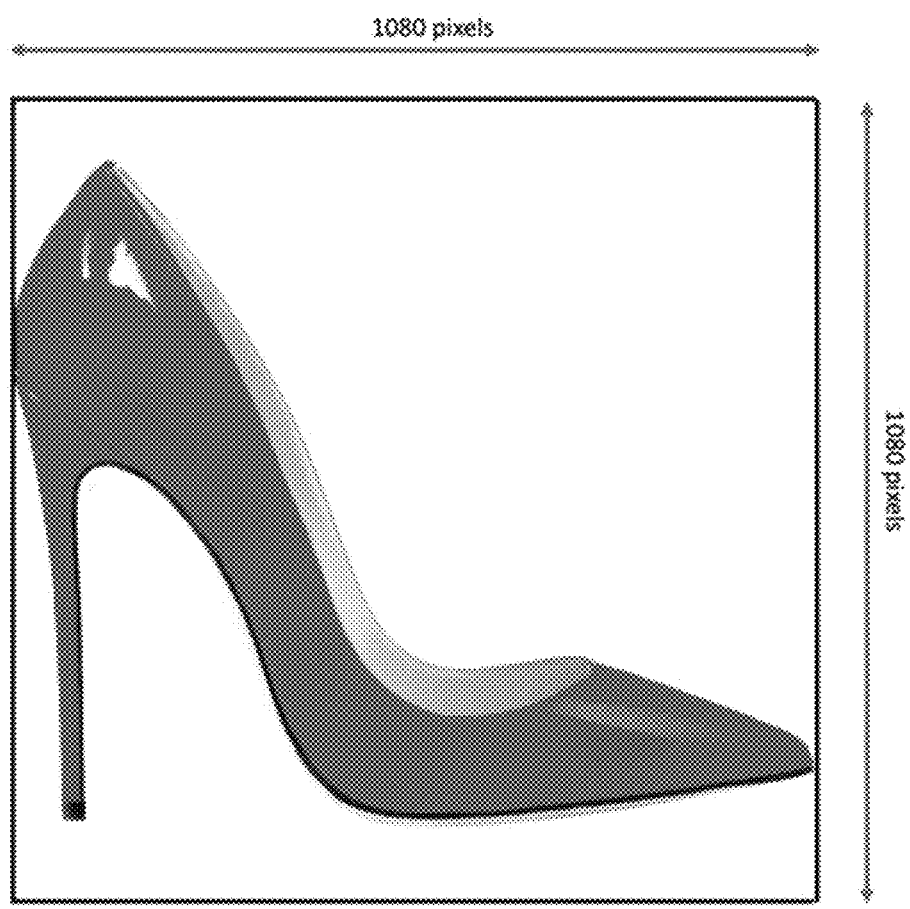
FIG. 12 is an exemplary image of a red pump compressed into a square 1080 ×1080-pixel frame with the heel portion of the red pump shown abutting the left side edge of the 1080×1080-pixel frame.

The 5 core remaining images that are selected are the left profile; the right profile; the front; the rear; and the top of the item (see FIG. 11). At 1006 the 5 core remaining images are then compressed to square 1080×1080-pixel frame, with the longest side of the item in the image abutting the edge of the frame. In FIG. 12, the longest part of the item is the heel portion of the red pump and it is shown abutting the left side edge of the square 1080×1080-pixel frame. These remaining compressed five core images are designated as the template images for training and template matching.

As high definition (HD) screens and mobile devices are usually 1920×1080 pixels, a square 1080×1080-pixel frame is roughly the maximum size of a potential input image within a frame. Default settings for training and template matching sets are five 1080×1080-pixel images, but template matching sets may be adjusted in the event that a different pixel dimension or a different aspect ratio yields higher accuracy in template matches. Administrators may customize these settings.

Full complete images are used for a global template matching algorithm, when a full (non-obscured) item is detected in an input image. However, for instances wherein an item is partially obscured by another object, a local template matching algorithm may be used. One type of local template matching algorithm is general localization and another type is feature extraction. These two methods may be used separately or together.

Figure 13:
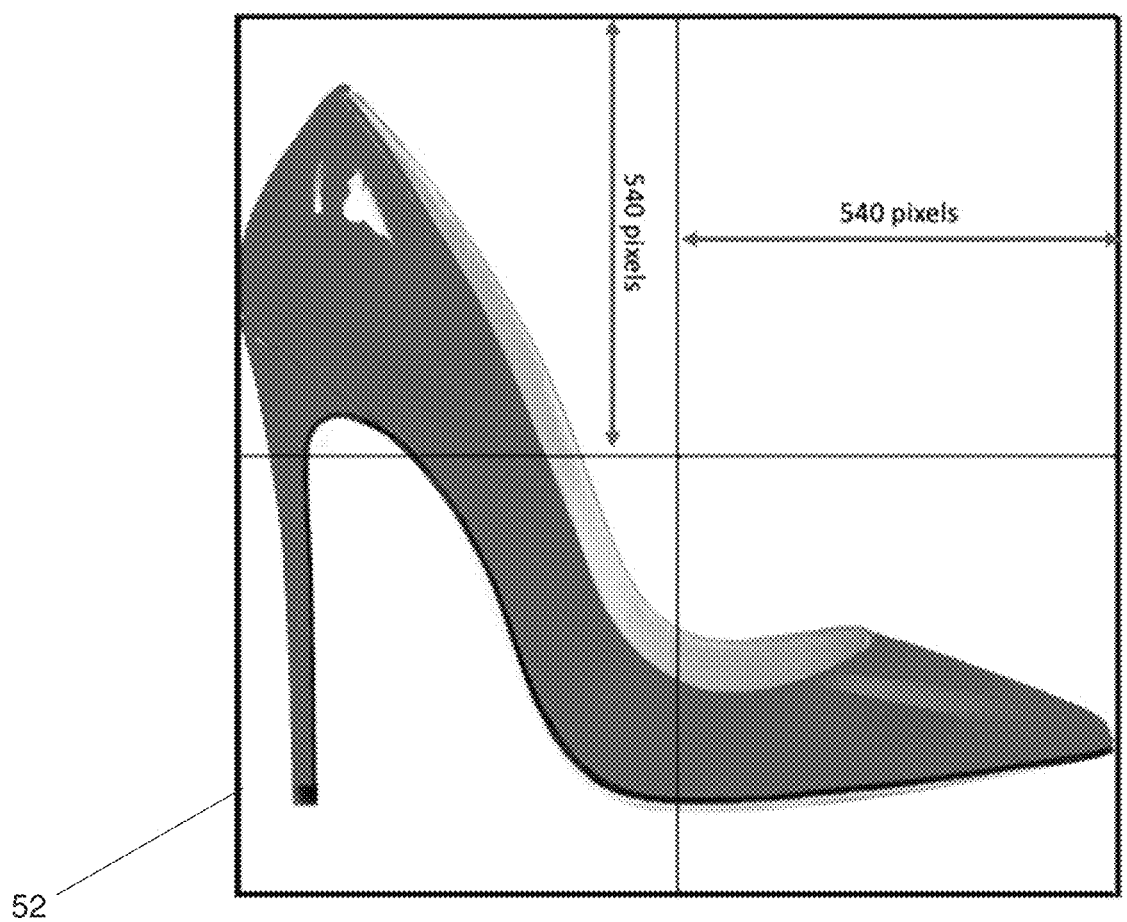
FIG. 13 shows a 2×2 grid box being applied to an object image.
Figure 14:
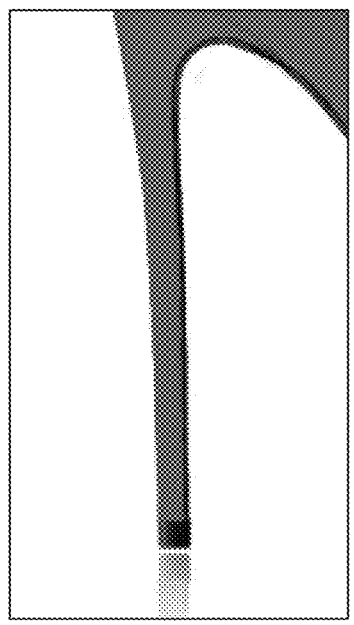
FIG. 14 shows the heel of the red pump as the distinct feature.

For general localization, at 1008 a 2×2 grid box 52 will be applied to item images (or object images), where each box within the grid 52 is 540×540 pixels (see FIG. 13). This allows template matching to occur within one of the four boxes within the grid 52 rather than with a complete image, With feature extraction at 1010, administrators are able to determine distinct parts or features of classification set types for the neural network 34 to focus on when using localized template matching. In the example of the red pump, the heel is a distinct part or feature (see FIG. 14).

An object with this distinct part or feature has a weighted probability of being in the "footwear" classification set, and having "apparel," "shoe," "women's," and "pump" tags assigned to it. The weighted percentage increase will be determined by administrators, Any image sets that have been entered into the database may be used in the process of matching training/template images to input images through the recognition application 36.

Figure 15:
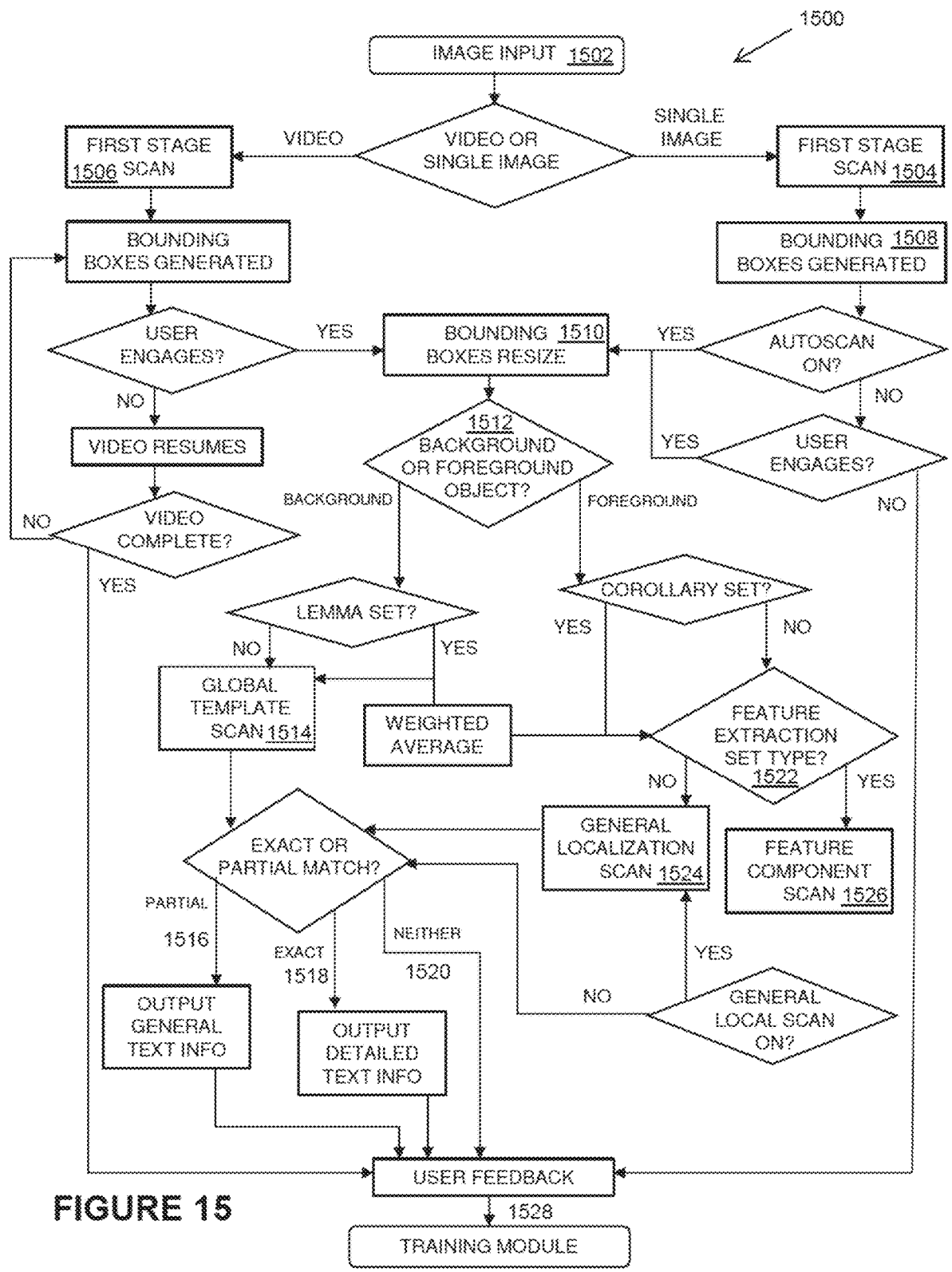
FIG. 15 is an exemplary flowchart showing the steps performed by the recognition application portion of the consumer product identification system of FIG. 1.
Figure 16:
FIG. 16 shows an exemplary image that may be either scanned or uploaded into the recognition application.

FIG. 15 is an exemplary flowchart 1500 showing the steps performed by the recognition application 36. At 1502 an input image of an unknown consumer product is sent to the recognition application 36. The input image may be sent in two ways, either through a single image scan taken by the camera on a mobile device or computer 1504, or by uploading an image file or video 1506. Whether scanned or uploaded, the image recognition process works the same way. An example of an image, which may either be scanned or uploaded, is shown in FIG. 16.

Using the YOLO method, the input image is analyzed. At 1508 bounding boxes 54 are created around objects belonging to identified classification set types when those objects within the input image reach a certain confidence rating. The default is a .25 (25%) confidence rating, but administrators may set the threshold at a higher or lower percentage.

Figure 17:
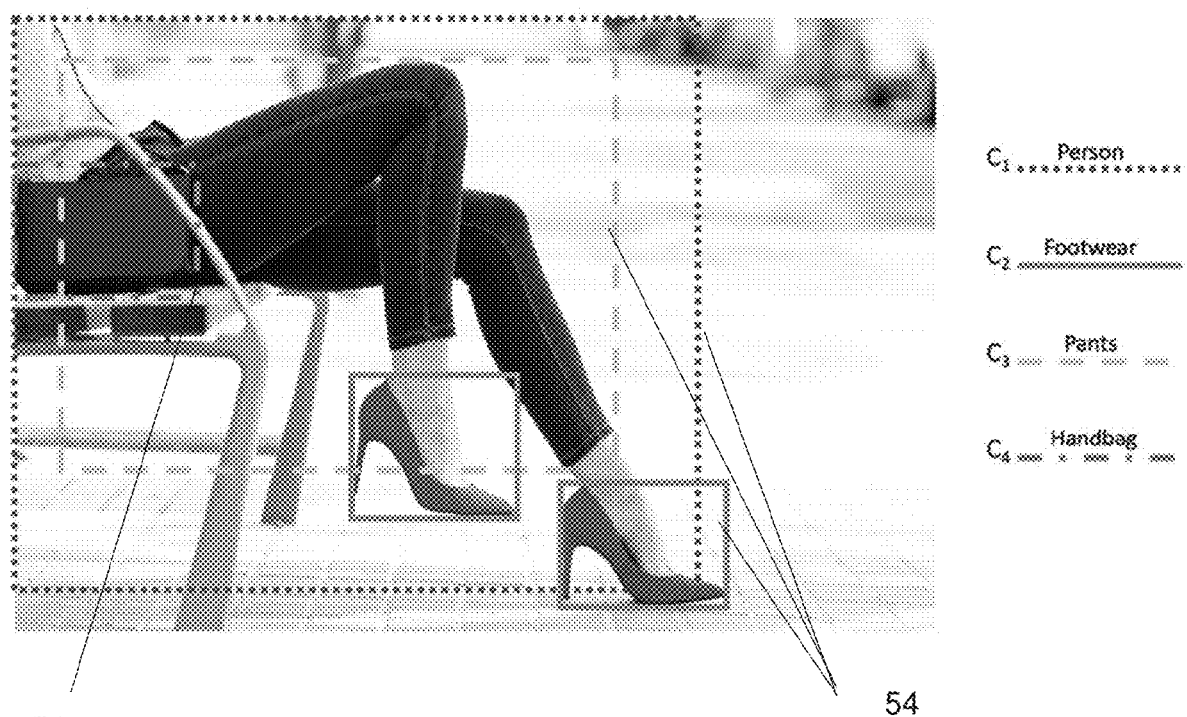
FIG. 17 shows an exemplary input image scan at the first stage of identification with bounding boxes applied to the items and objects detected within the input image.

The YOLO method creates bounding boxes 54 around recognized items and objects within the input image, A bounding box 54 is a 4-sided outline (square or rectangular) that may be either transparent or visible to the user, which identifies classification sets. The general classification set types are assigned to objects within the image using a single, fast, convolutional neural network (CNN) layer. General classification assignment helps to narrow subsets of template images for each generated bounding box. FIG. 17 shows an exemplary input image scan at the first stage of identification with the bounding boxes 54 applied.

The YOLO algorithm bounding box 54 has the following data:
$P_c$ (Probability of the Class)
$B_x$ (x coordinate in the Bounding Box)
$B_y$ (y coordinate in the Bounding Box)
$B_w$ (Width of Bounding Box)
$B_h$ (Height of Bounding Box)
$C_1$ (Classification 1)
$C_2$ (Classification 2)
$C_3$ (Classification 3)
$C_4$ (Classification 4)

While the example shows 4 classification sets, there may be an indefinite number of classifications sets as determined by administrators. For the example herein, the identified classification types in the input image is one where $C_1$ is a person, $C_2$ is footwear, $C_3$ are pants, and $C_4$ is a handbag. In this example, the scanned image is a single frame from a television show of a woman whose character name is Joanne, and she is wearing red shoes, The following classification sets would be generated from this image:
$C_1$—Person
$C_2$—Footwear
$C_3$—Pants
$C_4$—Handbag The present invention improves the YOLO methods because some bounding boxes 54, "lemma sets," alter the identification probability statistics of other bounding boxes 54 called "corollary sets." As seen in FIG. 17, some bounding boxes 54 overlap others. Object $C_3$ (pants) is a corollary set because it fully overlaps object $C_1$ (person), a lemma set. Therefore, the probability of $C_3$ being an apparel item increases and the neural network 34 focuses on classification sets containing apparel tags for that item (object $C_3$/pants).

The following formula is applied to detected items overlapping the lemma sets:
Percentage Increase=(% final-% initial)/% initial×100,
where both % final and % initial are in the range of [0, 1]. For example, if the initial YOLO scan produces a bounding box 54 on $C_3$ with a confidence score of .58 (or 58%) that the object is an apparel item, the full overlap with $C_1$ increases the confidence score percentage and narrows search parameters to template and training images that have apparel tags. Percentage increase of corollary sets being certain classification sets and tags will be determined through testing and will be configurable by administrators. Bounding boxes 54 and text information might be visible or invisible to the user, depending on setting configurations determined by the admin.

Each bounding box 54 will go through a second stage of identification using local template matching with scalable diversity similarity (SDS). For a still image, the second stage of identification can either be automatic or triggered by an additional interaction on the part of a user (e.g. user touching the item on the screen), a configuration that may be determined by administrators for different use cases.

Figure 18:
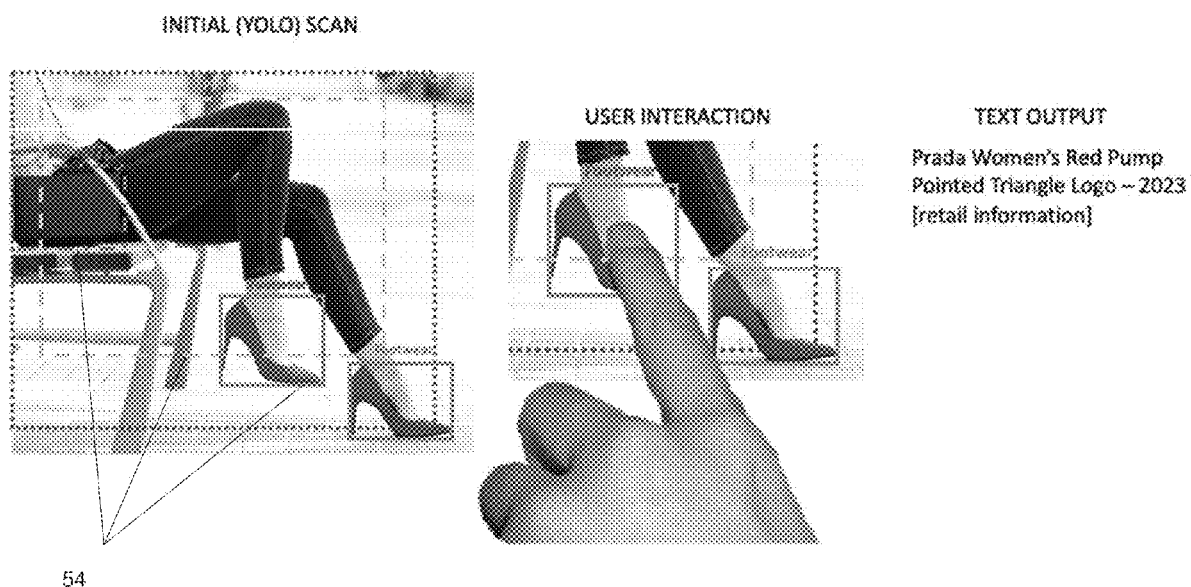
FIG. 18 shows an exemplary user interface for a video when the recognition application is running on the user's electronic device.
Figure 19:
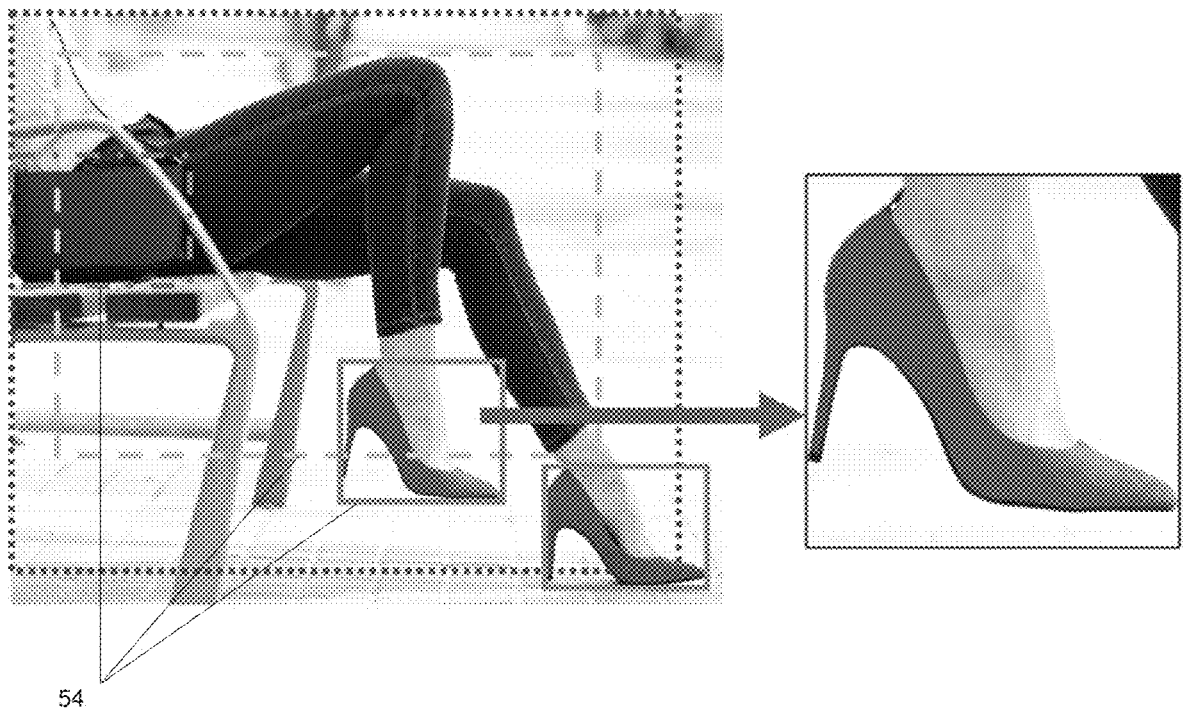
FIG. 19 shows a bounding box being resized into square-shaped boxes during the second stage of identification where the transparent area used to make the square-shaped box will be applied on the sides where the object does not abut the edge of the frame.

For videos, the second stage of identification must be triggered by the user interacting with a bounding box on a connected device that is capable of interactivity (i.e. touch screen on a computer, phone, smart TV, etc.). FIG. 18 shows an example of the user interface for a video when the recognition application 36 is running on the user's electronic device 28. For videos, the video may pause when the user triggers the second stage of identification to display the more detailed information.

During the second stage of identification, for both still images and videos, bounding boxes 54 will be resized at 1510 into square-shaped boxes so that template matching will be close to a one-to-one ratio. Using the x,y coordinates from the bounding box as the center point, the additional transparent area used to make the square-shaped box will be applied on the sides where the object does not abut the edge of the frame (see FIG. 19).

At 1512 the recognition application 36 will determine which objects are in the background (lemma sets) and which objects are in the foreground (corollary sets). A weighted average may be applied if certain parts of an image set have quadrants that are of greater importance than others; e.g. if the consumer product were an umbrella, the upper half of the umbrella (canopy and end tip) would be of greater importance than the lower half (shaft and handle). An administrator may determine whether to apply a weighted average to a consumer product 50 and on what portions of the consumer product 50 to apply the weighted average. Objects with no other bounding boxes 54 overlapping in front of them will be considered foreground objects, and global template matching will be applied (full image) at 1514. If a partial match at 1516 or an exact match at 1518 is found, then detailed information about the item is sent to the user. If neither a partial match nor an exact match is found at 1520, then the user is notified that no match was found. In any instance 1516, 1518, or 1520, the user may be asked to provide feedback regarding the search at 1528 and that feedback is sent to the training module 38.

The Nearest Neighbor (NN) method in current template matching methods finds an image from a template set closest in distance to the new point and predicts the label from these. However, the novel aspect of the present invention is SDS in the template matching system, i.e. using the polar angle of the polar coordinate for the calculation of spatial distance, improving its ability to find template matches with more extreme degrees of rotational differences than existing methods that use Cartesian coordinate.

The SDS formula used in the template matching system of the present invention is represented as follows:

$$SDS(T, Q, s, \mathcal{Q}) = \lambda_1 \frac{\sum_{q_j} I(\tau(q_j) \neq 0) \sum_{t_i} I(\varepsilon(t_i) \neq 0)}{\sum_{q_j} |\rho(q_j) - s\rho(NN(q_j, T))|} U.$$

In this formula:
T is the template image (made up of pixels $t_i$)
$q_j$ are pixels in the candidate image window
$NN(q_j,T)$ returns the nearest neighbor pixel in the Template set to the pixel $q_j$ in the candidate window, Q
rho(x) returns the radial distance of the pixel x in the polar coordinate frame: the distance from the geometric center of T or Q, depending on whether it is operating on the Template or Candidate image
s is a scaling factor between T and Q
$q_j$ in the template window, where sum is of the absolute value of the radius of each pixel
$q_j$ minus a scaling term s times the radius of the nearest neighbor of T to the pixel $q_j$
$\varepsilon(t_i)$ which indicates the number of points $q_j \in Q$ whose NNs are equal to $t_i$ in direction T→Q Epsilon counts the number of candidate window pixels that have template pix $t_i$ as their neighbor. Large value of $\epsilon(t_i)$ indicates that many points in Q have the same NN of $t_i$, which will lower the diversity. When $\epsilon(t_i)=0$, similarly it means low contribution to the diversity. Furthermore, due to the scaling s between Q and T, one point can be the NN of multiple points, when $1 \le \epsilon(t_i) \le s$, it contributes to the diversity. Finally, when $\epsilon(t_i) > s$, it will lower the diversity. The I() function just takes those tau/epsilon values and makes them=1 if the functions are not zero, and zero otherwise.

The numerator will (total # of all pixels $q_j$ where tau($q_j$) !=0)*(total pixels $t_i$ where epsilon($t_i$) !=0). Lambda and U are normalization factors that keep the distance metric bounded and scaled.

Figure 20:
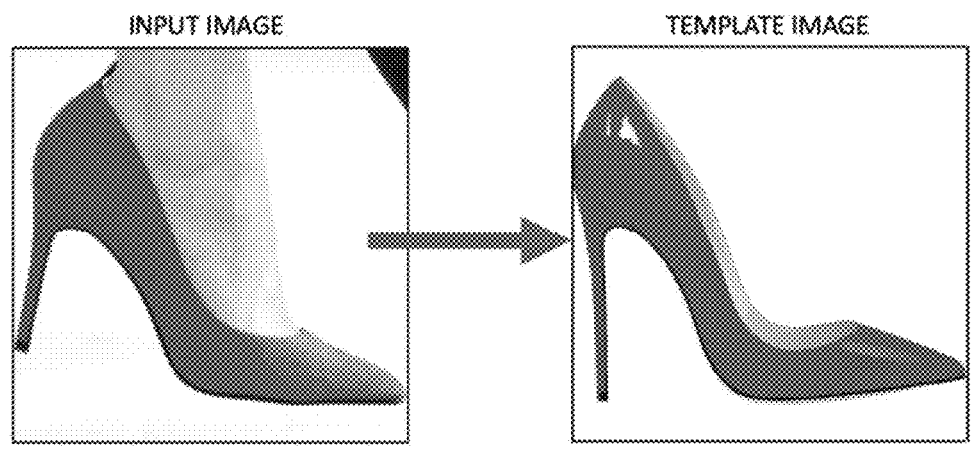
FIG. 20 shows an example of a template match of an identified object where the full object within the input image is completely visible and unobstructed.

A template match of an identified object where the full object in the input image is visible (not partially covered by another bounding box) would look like that shown in FIG. 20.

At 1522 for bounding boxes that are behind others, background objects the identified object is partially obscured), local template matching will apply, using general localization or feature extraction, or both. The priority of which type to use for given classification sets can be determined by administrators.

Figure 21:
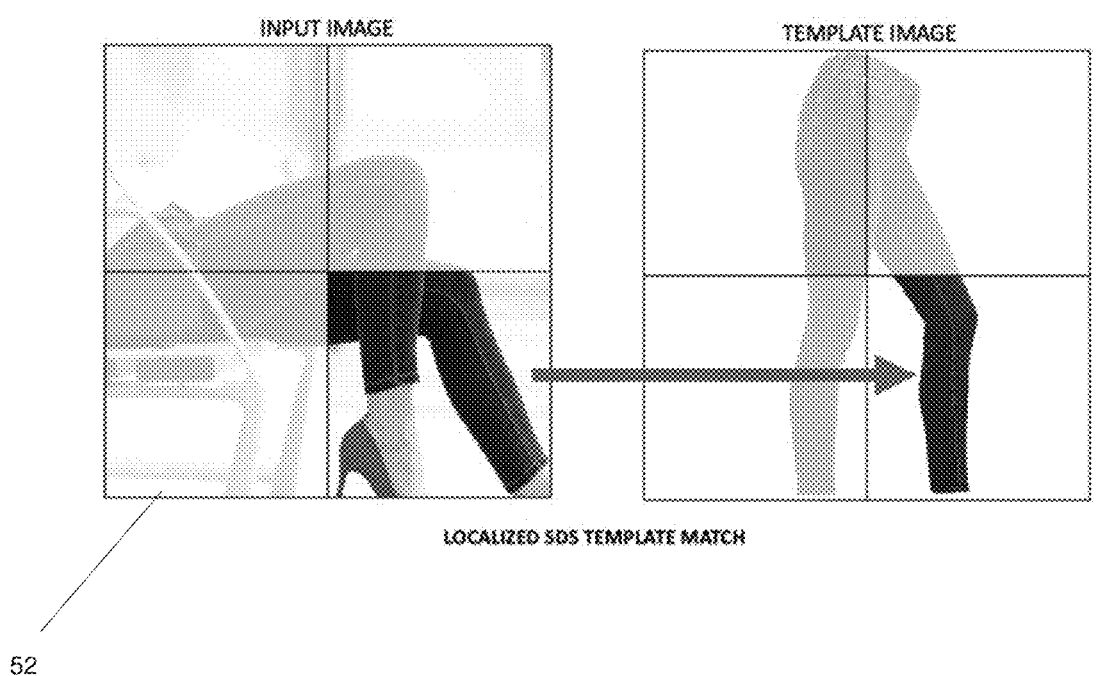
FIG. 21 shows an example of a 2×2 grid box used in local template matching for partially obscured background objects.
Figure 22:
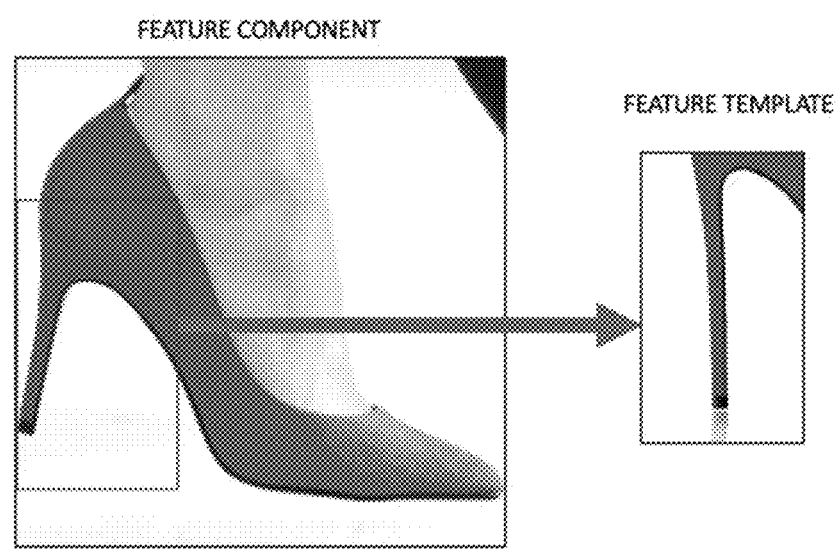
FIG. 22 shows an example of using the distinct feature of a heel of a red pump for feature extraction.

For local template matching, general localization at 1524 uses the 2×2 grid, so parts of an input image will be matched to grid boxes 52 in template/training images to find matches (see FIG. 21). Administrators will be able to adjust the localization grid from 2×2, to 3×3, or 4×4, which would reduce pixel count of each grid box 52 to 360×360 pixels or 270×270 pixels, respectively. For feature extraction at 1526, certain distinguishing features highlighted by admins will be used to identify items (see FIG. 22). Both general localization and feature extraction will use the same SDS template matching process to match input items with template/training images.

While the purpose of the system is to recognize consumer products, objects such as buildings and street markers can be recognized as classification sets and used to modify probability of other sets (like how an object identified as a person can be used to alter identification probability of other detected objects). The identification of people can alter the probability of identified objects being in classification sets or having certain tags. The application of facial recognition could be used to identify a character on a show and refine the focus of template matching categories.

In one example where the image is captured from a TV show or movie, and the person in the image is a character named Joanne, facial recognition template-matching may produce the following result:
>Character—Joanne Items overlapping a person will have an increased probability of being certain apparel items or jewelry. The probability increase can be set by the administrator using the formula (above) for overlapping bounding boxes.
Percentage Increase=(% final-% initial)/% initial x 100, where both % final and % initial are in the range of [0, 1].

Tags applied to items that are identified through template matching are displayed to the user in a clear and organized manner. For example, the RTS would produce the following for the red pump:
>Classification Set—footwear
>$1^{st}$ tag—Apparel
>$2^{nd}$ tag—Shoe
>$3^{rd}$ tag—Women
>$4^{th}$ tag—Pump
>$5^{th}$ tag—Red
>$6^{th}$ tag—Material—Leather
>$7^{th}$ tag—Brand—PRADA®
>$8^{th}$ tag—Model—Pointed Triangle-Logo Pump
>$9^{th}$ tag—Year—2023
>$10^{th}$ tag—Season—Summer
>$11^{th}$ tag—Consumer Data (such as hyperlink to e-commerce)
>$12^{th}$ tag—Additional Information (if applicable)

When displayed on the user interface for the user, the data above may be edited and/or reorganized in a manner such as the following:
Prada Women's Red Pump
Pointed Triangle Logo—2003
[retail information]

The way that the tagging information is displayed on the user interface for the user may be configurable by the administrator for each classification set type.

In one example, a 90% confidence rating would occur (refer to FIG. 9). For the user, the recognition application generates the following information based on matches with similar image sets:
Women's Red Pump
Similar types: [retail information for similar shoes]

At 1528 both administrators and users may provide feedback through the recognition application 36. This feedback includes, but is not limited to, rating or providing comments on the accuracy of item identification, the usability of the recognition application, and the speed at which an item is identified. For example, a feedback prompt may be a simple "thumbs up" or "thumbs down" for a detected item on whether the match met the expectation of the user. A "thumbs down" may generate an additional feedback inquiry allowing a user to enter a text response. The feedback may be relayed to the training module to aid in making necessary improvements to the image set capture process, the neural network image optimization (reduction, compression, and tagging) process, and recognition application accuracy and efficiency.

Figure 23:
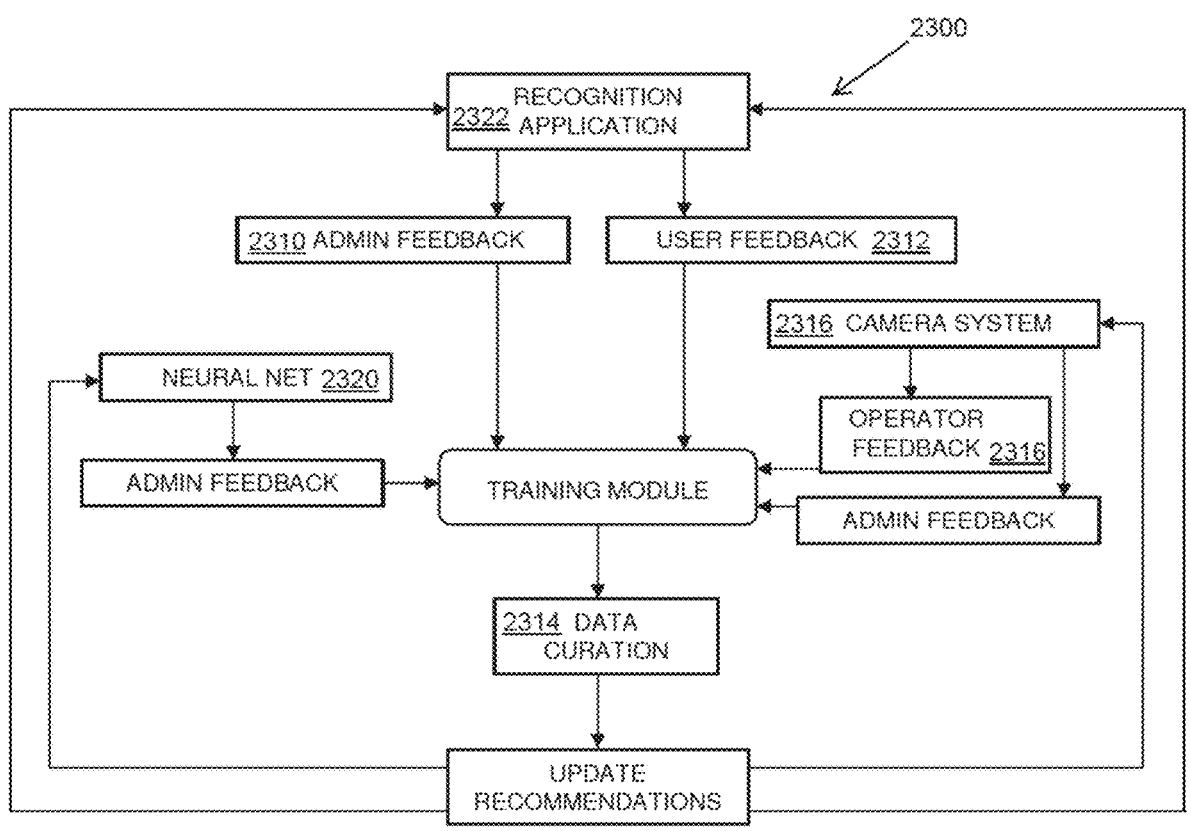
FIG. 23 is an exemplary flowchart showing the steps performed by the training module portion of the consumer product identification system of FIG. 1; and FIGURE: 24 is an exemplary flowchart showing operations for machine learning based consumer product identification.

FIG. 23 is an exemplary flowchart 2300 showing the steps performed by the training module 38. The training module's 38 purpose is to continuously improve the other three components of the system: the camera system 22, the neural network 34, and the recognition application 36. The training module 38 receives information from the recognition application 36, including item identification and usability ratings from administrator input and user input, along with backward error propagation data from the neural network 34.

There are several ways that the training module may receive data. Initially, the training module 38 may receive data from operators 2316, administrators 2310, and users 2312. Increasingly over time, the training module may receive data from its own internal feedback.

Feedback may be used to give update recommendations, including:
Altering Camera and Lighting Setups
The Number of Images in a Training/Template Image Set
The Configuration of Images in a Training Image Set
The Priority of One Type of Localization Match Over the Other (general localization or feature extraction)
Weighted Averages for Identifying Detected Objects that Overlap Certain Other Objects
Grid Parameters for General Localization (pixel dimension)
Pixel Dimensions for Images in Training/Template Image Sets
Confidence Rating Thresholds for Bounding Boxes
Weighted Averages for Feature Extraction Matches Being Certain Types of Items The objective is to determine the equilibrium between image recognition accuracy and processing efficiency. If recommendations are taken, then this data is curated at 2314 and changes may be made either manually or automatically, and the training module 38 will make updates to the camera system 42 at 2316, the neural network 34 at 2320, and the recognition application 36 at 2322 accordingly.

Figure 24:
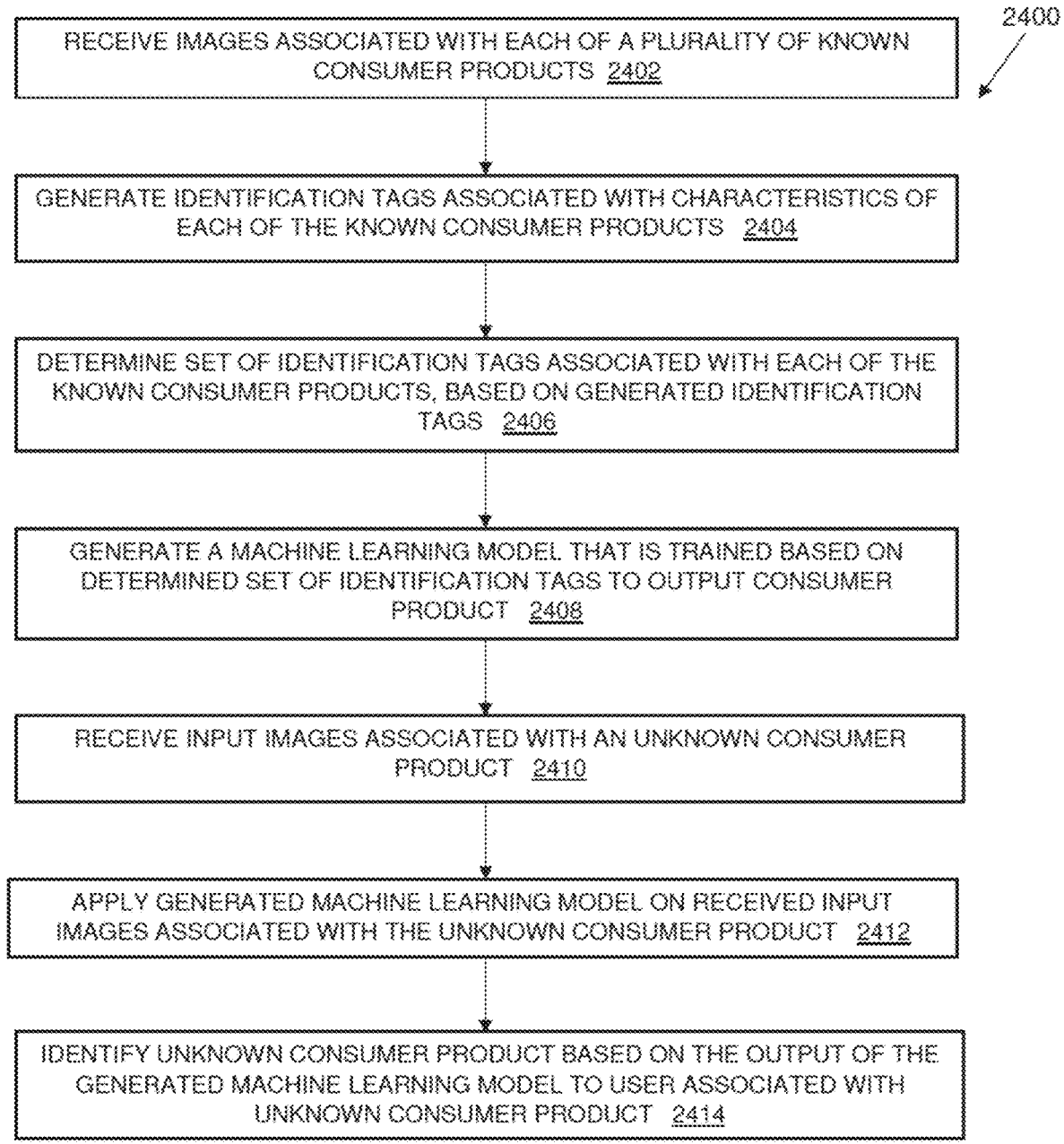

FIG. 24 is a flowchart 2400 that illustrates exemplary operations for machine learning based consumer product identification in accordance with one or more embodiments of the present invention. The flowchart is described in conjunction with FIGS. 1-23. The operations from 2402 to 2416 may be implemented by the neural network 34 of FIG. 2. The operations of the flowchart 2400 may start at 2402 and proceed to 2416.

At 2402, images from of known consumer products 50 are received from one or more camera systems 22. Each of the known consumer products 50 may be generally classified based on a type of consumer product; e.g. footwear, pants, shirt, electronics, jewelry, eyewear, vehicle, etc. The neural network 34 may be configured to receive the images from the camera systems 22 where the known consumer products 50 may be classified based on the type of consumer product 50 it is.

At 2404, identification tags, associated with characteristics of each of the known consumer products 50 may be generated based on the received images. The neural network 34 may be configured to generate the identification tags based on the received images. Alternatively, the identification tags may be generated manually by the camera system 22 operator.

At 2406, a set of identification tags, associated with the characteristics of each of the known consumer products may be determined based on the generated identification tags. The neural network 34 may determine the set of identification tags based on the generated based on the generated identification tags.

At 2408, a machine learning model may be generated. The generated machine learning model may be trained based on the determined set of identification tags to output a consumer product 50. The neural network 34 may be configured to generate the machine learning model which is trained based on the determined set of identification tags to output a consumer product 50.

At 2410, an input image associated with an unknown consumer product 50 may be received from the recognition application 36. The input image is initially captured by a camera system 22 or by an electronic device 28 of a consumer 26. The unknown consumer product 50 may be the same or different from the known consumer products 50 on which the machine learning model may be generated. The neural network 34 may be configured to receive the input image associated with the unknown consumer product 50 from the recognition application 36.

At 2412, the generated machine learning model may be applied on the received input image. The neural network 34 may be configured to apply the generated machine learning model on the received input image.

At 2414, the unknown product may be identified to the user, based on the output of the generated machine learning model. The neural network 34 may be configured to identify the unknown product to the user through the recognition application 36, based on the output of the generated machine learning model. The operations may then end.

The foregoing description is illustrative of particular embodiments of the application, but it is not meant to be limitation upon the practice thereof. While embodiments of the disclosure have been described in terms of various specific embodiments, those skilled in the art will recognize that the embodiments of the disclosure may be practiced with modifications within the spirit and scope of the claims.

What is claimed is:

1. A consumer product identification system comprising:
   a camera system configured to create an image set of a known consumer product, wherein the camera system creates the image set of the known consumer product by:
     placing the known consumer product on a rotating platform;
     taking one image of the known consumer product at every 30° of horizontal rotation of the rotating platform resulting in twelve initial images;
     tilting the known consumer product by 45° onto its side on the rotating platform; and
     taking one image of the known consumer product at every 30° of horizontal rotation of the rotating platform resulting in twelve additional images and a total of twenty-four images in the image set of the known consumer product;
   a neural network configured to:
     receive the image set of the known consumer product from the camera system;
     store the image set as a template image set in a database connected to the neural network;
     assign a plurality of identification tags to the template image set of the known consumer product, wherein the plurality of identification tags is based on characteristics of the known consumer product; and
     generate a machine learning model which is trained based on the assigned set of identification tags to output the known consumer product;
   a recognition application configured to:
     receive an input image of an unknown consumer product;
     compare the input image of the unknown consumer product to the template image set of the known consumer product;
     determine whether the input image of the unknown consumer product matches the template image set of the known consumer product; and
     identify the unknown consumer product when the image of the unknown consumer product matches the template image set of the known consumer product; and
   a training module configured to:
     receive feedback from a system user regarding accuracy of identification of the unknown consumer product;
     adjust settings in at least one of the camera system, the neural network, and the recognition application based on the feedback received from the system user.

2. The consumer product identification system of claim 1, wherein the camera system further comprises:
   a modular frame;
   at least one camera coupled to the frame;
   at least one light movably coupled to the frame; and
   a computing system connected to the neural network.

3. The consumer product identification system of claim 1 wherein the neural network storing the image set as the template image set in the database comprises the steps of:
   reducing the number of images in the image set of the known consumer product from twenty-four images to five core images, wherein the five core images are: a right profile image, a left profile image, a front image, a rear image, and a top image;

compressing each of the five core images from an original pixel size of 3840×2160 pixels to a square 1080×1080-pixel frame, wherein the longest part of the known consumer product abuts an edge of the square 1080×1080-pixel frame; and designating the five core images for template matching.

4. The consumer product identification system of claim 3 wherein the neural network assigning the plurality of identification tags to the known consumer product shown within the template image set comprises the step of a camera system operator using a ranked tagging system to manually assign initial identification tags to the known consumer product, the ranked tagging system providing increasing levels of detail with each tag.

5. The consumer product identification system of claim 4 wherein the neural network assigning the plurality of identification tags to the known consumer product shown within the template image set further comprises the step of the neural network using the ranked tagging system to automatically assign subsequent identification tags to the known consumer product.

6. The consumer product identification system of claim 1 wherein an input image of at least a second consumer product is received from at least one of the camera system and an electronic device of a consumer.

7. The consumer product identification system of claim 1 wherein the recognition application is further configured to:
   assign a general classification to at least a second consumer product within the input image;
   select one template image set from a plurality of template image sets stored on the database, wherein the selected template image set belongs to the same general classification as the second consumer product within the input image;
   apply a template matching algorithm to compare the input image of the unknown consumer product to the selected template image set; and
   determine whether the input image of the unknown consumer product matches the selected template image set.

8. The consumer product identification system of claim 7 wherein the recognition application applies a global template matching algorithm when the unknown consumer product within the input image is unobstructed.

9. The consumer product identification system of claim 7 wherein the recognition application applies a local template matching algorithm when the unknown consumer product within the input image is partially or fully obstructed.

10. The consumer product identification system of claim 9 wherein the local template matching algorithm is at least one of a general localization algorithm and a feature extraction algorithm.

11. The consumer product identification system of claim 10 wherein the general localization algorithm comprises the step of applying a 2×2 grid to the input image, each box within the grid being 540×540 pixels, and wherein template matching occurs within one of the four boxes within the grid.

12. The consumer product identification system of claim 10 wherein the feature extraction algorithm comprises the step of determining a distinct feature of the unknown consumer product and template matching is focused on the distinct feature.

13. The consumer product identification system of claim 1 wherein the step of determining whether the input image of the unknown consumer product matches the template image set of the known consumer product comprises one of the steps of:
   the recognition application determines that an exact match exists between the input image of the unknown consumer product and the template image set;
   the recognition application determines that a close match exists between the input image of the unknown consumer product and the template image set; and
   the recognition application determines that no match exists between the input image of the unknown consumer product and the template image set.

14. The consumer product identification system of claim 13 wherein the step of identifying the unknown consumer product comprises at least one of the steps of:
   the recognition application sending an alert to the camera system that the input image will not be entered into the neural network when an exact match is determined between the input image of the known consumer product and the template image set;
   the recognition application sending information relating to the unknown consumer product to an electronic device of a consumer when an exact match is determined between the input image of the unknown consumer product and the template image set;
   the recognition application sending information relating to the unknown consumer product to the electronic device of the consumer when a close match is determined between the input image of the unknown consumer product and the template image set.

15. A method for identifying consumer products comprising the steps of:
   providing a camera system, the camera system creating an image set of a known consumer product for storage on a database, the image set comprising a plurality of images having a pixel size of 3840×2160 pixels;
   providing a neural network, the neural network:
      selecting five core images from the image set of the known consumer product;
      compressing each of the five core images to a square 1080×1080-pixel frame;
      designating the five core images as a template image set for template matching;
      assigning a plurality of identification tags to the template image set, wherein the plurality of identification tags is based on characteristics of the known consumer product; and
      generating a machine learning model which is trained based on the assigned plurality of identification tags to output the known consumer product; and
   providing a recognition application, the recognition application:
      receiving an input image of at least one unknown consumer product;
      assigning a general classification to the at least one unknown consumer product within the input image;
      selecting one template image set from a plurality of template images sets stored on the database, wherein the selected template image set belongs to the same general classification as the at least one unknown consumer product within the input image;
      applying a template matching algorithm to compare the input image of the at least one unknown consumer product to the selected template image set;
      determining whether a match between the input image of the at least one unknown consumer product and the selected template image set is greater than 99%, between 90% and 99%, or less than 90% accurate; and sending information relating to the at least one unknown consumer product to an electronic device of a consumer when the match between the input image of the at least one unknown consumer product and the template image set of the known consumer product is greater than 90%, between 90% and 99%.

16. The method for identifying consumer products of claim 15, wherein the recognition application applying the template matching algorithm comprises the steps of:

creating a bounding box around the at least one unknown consumer product within the input image, the at least one unknown consumer product belonging to a classification set type;

designating the classification set within the bounding box as a corollary set when the bounding box is unobstructed;

designating the classification set within the bounding box as a lemma set when the bounding box is obstructed;

wherein a lemma set alters identification probability statistics of a corollary set.

17. The method for identifying consumer products of claim 16 wherein a global template matching algorithm is applied when the at least one unknown consumer product within the bounding box belongs to an unobstructed corollary set.

18. The method for identifying consumer products of claim 16 wherein a local template matching algorithm is applied when the at least one unknown consumer product within the bounding box belongs to an obstructed lemma set, the local template matching algorithm being at least one of a general localization algorithm and a feature extraction algorithm.

19. A non-transitory computer-readable medium having stored thereon computer executable instructions that when executed by a computer, causes the computer to execute operations, the operations comprising:

receiving an image set associated with each of a plurality of known consumer products, the image set being created by a camera system and received by a neural network from the camera system;

storing the image set as a template image set in a database connected to the neural network;

generating identification tags associated with characteristics of each of the known consumer products, the identification tags being generated by the neural network;

assigning a set of identification tags to the template image set of each of the known consumer products, the set of identification tags being assigned by the neural network;

generating by the neural network a machine learning model which is trained based on the assigned set of identification tags to output one consumer product from the plurality of known consumer products;

receiving an input image of an unknown consumer product, the input image being received by a recognition application;

comparing by the recognition application the input image of the unknown consumer product to the template image sets of the known consumer products;

determining by the recognition application whether the input image of the unknown consumer product matches the template image set of one of the known consumer products, wherein determining whether the input image of the unknown consumer product matches the template image set of the known consumer product comprises one of the steps of:

determining that an exact match exists between the input image of the unknown consumer product and the template image set of one of the plurality of known consumer products;

determining that a close match exists between the input image of the unknown consumer product and the template image set of one of the plurality of known consumer products; and determining that no match exists between the input image of the unknown consumer product and the template image set of one of the plurality of known consumer products;

identifying the unknown consumer product when the image of the unknown consumer product matches the template image set of one of the plurality of known consumer products; the unknown consumer product being identified by the recognition application;

receiving feedback from a system user regarding accuracy of identification of the unknown consumer product, the feedback being received by a training module; and adjusting settings in at least one of the camera system, the neural network, and the recognition application based on the feedback received by the training module from the system user.

20. A consumer product identification system comprising:

a camera system configured to create a plurality of image sets, where one image set is created for each of a plurality of known consumer products;

a neural network configured to:
receive the plurality of image sets of the plurality of known consumer products from the camera system;
store each image set as a template image set in a database connected to the neural network;
assign a plurality of identification tags to the template image set of each of the plurality of known consumer products, wherein the plurality of identification tags is based on characteristics of each of the plurality of known consumer products; and
generate a machine learning model which is trained based on each assigned set of identification tags to output each of the plurality of known consumer products;

a recognition application configured to:
receive an input image of an unknown consumer product;
assign a general classification to at least a second consumer product within the input image;
selecting one template image set from a plurality of template image sets stored on the database, wherein the selected template image set belongs to the same general classification as the second consumer product within the input image;
applying a template matching algorithm to compare the input image of the unknown consumer product to the selected template image set;
determining whether the input image of the unknown consumer product matches the selected template image set;
identifying the unknown consumer product when the image of the unknown consumer product matches the selected template image set; and a training module configured to:
  receive feedback from a system user regarding accuracy of identification of the unknown consumer product;
  adjust settings in at least one of the camera system, the neural network, and the recognition application based on the feedback received from the system user.

21. A consumer product identification system comprising:
a camera system configured to create an image set of a known consumer product;
a neural network configured to:
  receive the image set of the known consumer product from the camera system;
  store the image set as a template image set in a database connected to the neural network;
  assign a plurality of identification tags to the template image set of the known consumer product, wherein the plurality of identification tags is based on characteristics of the known consumer product; and
  generate a machine learning model which is trained based on the assigned set of identification tags to output the known consumer product;
a recognition application configured to:
  receive an input image of an unknown consumer product;
  compare the input image of the unknown consumer product to the template image set of the known consumer product;
  determine whether the input image of the unknown consumer product matches the template image set of the known consumer product by determining one of:
    that an exact match exists between the input image of the unknown consumer product and the images associated with one of the plurality of known consumer products;
    that a close match exists between the input image of the unknown consumer product and the images associated with one of the plurality of known consumer products; and
    that no match exists between the input image of the unknown consumer product and the images associated with the one of the plurality of known consumer products; and
  identify the unknown consumer product when the image of the unknown consumer product exactly matches or closely matches the template image set of the known consumer product; and
a training module configured to:
  receive feedback from a system user regarding accuracy of identification of the unknown consumer product;
  adjust settings in at least one of the camera system, the neural network, and the recognition application based on the feedback received from the system user.

* * * * *